(12) United States Patent
Wu et al.

(10) Patent No.: US 12,366,017 B2
(45) Date of Patent: Jul. 22, 2025

(54) TOUCH-SENSITIVE CORD

(71) Applicant: Google LLC, Mountain View, CA (US)

(72) Inventors: Tong Wu, Mountain View, CA (US); Ivan Poupyrev, Sunnyvale, CA (US); Xiaoyu Guo, Santa Clara, CA (US); Shiho Fukuhara, Tokyo (JP); Shozo Harada, Tokyo (JP); Adam Bernstein, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 65 days.

(21) Appl. No.: 18/010,327

(22) PCT Filed: Aug. 20, 2021

(86) PCT No.: PCT/US2021/046813
§ 371 (c)(1),
(2) Date: Dec. 14, 2022

(87) PCT Pub. No.: WO2022/040491
PCT Pub. Date: Feb. 24, 2022

(65) Prior Publication Data
US 2023/0279589 A1 Sep. 7, 2023

Related U.S. Application Data

(60) Provisional application No. 63/068,742, filed on Aug. 21, 2020.

(51) Int. Cl.
*D04C 1/02* (2006.01)
*G06F 3/041* (2006.01)

(52) U.S. Cl.
CPC ............ *D04C 1/02* (2013.01); *G06F 3/04164* (2019.05); *D10B 2401/16* (2013.01); *D10B 2401/18* (2013.01); *G06F 2203/04103* (2013.01)

(58) Field of Classification Search
CPC .. D04C 1/02; D10B 2401/16; D10B 2401/18; G06F 3/041; G06F 3/04164; G06F 3/0446; G06F 3/0447
See application file for complete search history.

(56) References Cited

U.S. PATENT DOCUMENTS 5,060,549 A * 10/1991 Beal .................... A63B 29/028
87/9
7,360,477 B2 * 4/2008 Hess ...................... D07B 1/025
87/13

(Continued)

FOREIGN PATENT DOCUMENTS

GB    2 574 152    12/2016

OTHER PUBLICATIONS

International Search Report for Application No. PCT/ US2021/046813, mailed on Jan. 24, 2022, 4 pages.

(Continued)

*Primary Examiner* — Shaun R Hurley
(74) *Attorney, Agent, or Firm* — DORITY & MANNING P.A.

(57) ABSTRACT

An interactive cord can include a plurality of non-conductive lines and a plurality of conductive lines arranged together in a first longitudinal portion to form a touch-sensitive area within a first longitudinal portion of the interactive cord. A non-touch-sensitive area can be formed in a second longitudinal portion such in which the plurality of conductive lines is not exposed along an outer surface of the outer layer. The plurality of conductive lines can be arranged together with the one or more of the plurality of non-conductive lines within a third longitudinal portion. The second longitudinal portion can be arranged between the first longitudinal portion and the third longitudinal portion with respect to a longitudinal direction of the interactive cord. The third longitudinal portion can be open along the (Continued)

longitudinal direction to form a pair longitudinal edges of the outer layer that extend in the longitudinal direction of the interactive cord.

22 Claims, 23 Drawing Sheets

(56) References Cited

U.S. PATENT DOCUMENTS

| | | | |
|---|---|---|---|
| 9,127,381 B2* | 9/2015 | Gao | D03D 1/0043 |
| 9,845,571 B2* | 12/2017 | Kirth | D04C 3/12 |
| 10,047,459 B1 | 8/2018 | Starner et al. | |
| 10,111,304 B2* | 10/2018 | Starner | H04R 1/1041 |
| 11,567,616 B2* | 1/2023 | Sato | G06F 3/044 |
| 11,809,666 B2* | 11/2023 | Sato | H04R 1/1041 |
| 2015/0045831 A1* | 2/2015 | Allen | A61B 17/04 87/8 |
| 2017/0115777 A1* | 4/2017 | Poupyrev | A41D 1/005 |
| 2018/0258562 A1* | 9/2018 | Fukuhara | D02G 3/12 |
| 2019/0004635 A1* | 1/2019 | Sawyer | H04R 1/1041 |
| 2019/0380708 A1* | 12/2019 | Allen | D04C 3/30 |
| 2022/0056762 A1* | 2/2022 | Hu | H01H 36/00 |

OTHER PUBLICATIONS

Olwal et al, "I/O Braid: Scalable Touch-Sensitive Lighted Cords Using Spiraling, Repeating Sensing Textiles and Fiber Optics", Session 9: Electronics, Oct. 14-17, 2018, Berlin, Germany, pp. 485-498.

International Preliminary Report on Patentability for Application No. PCT/US2021/046813, mailed Mar. 2, 2023, 14 pages.

\* cited by examiner

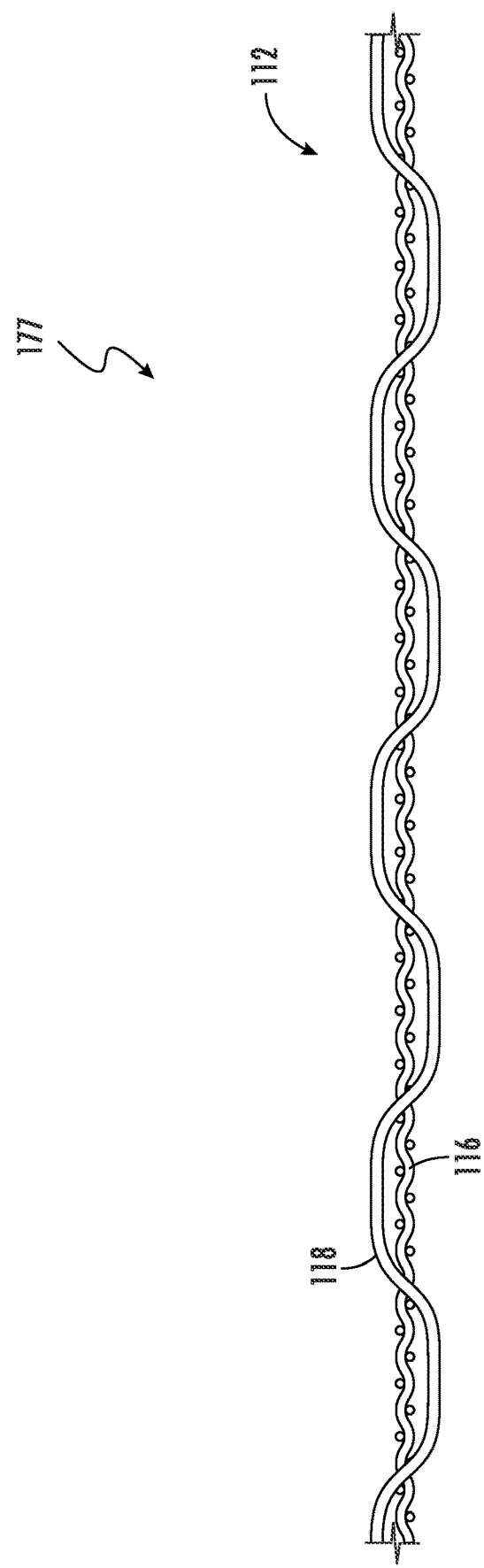

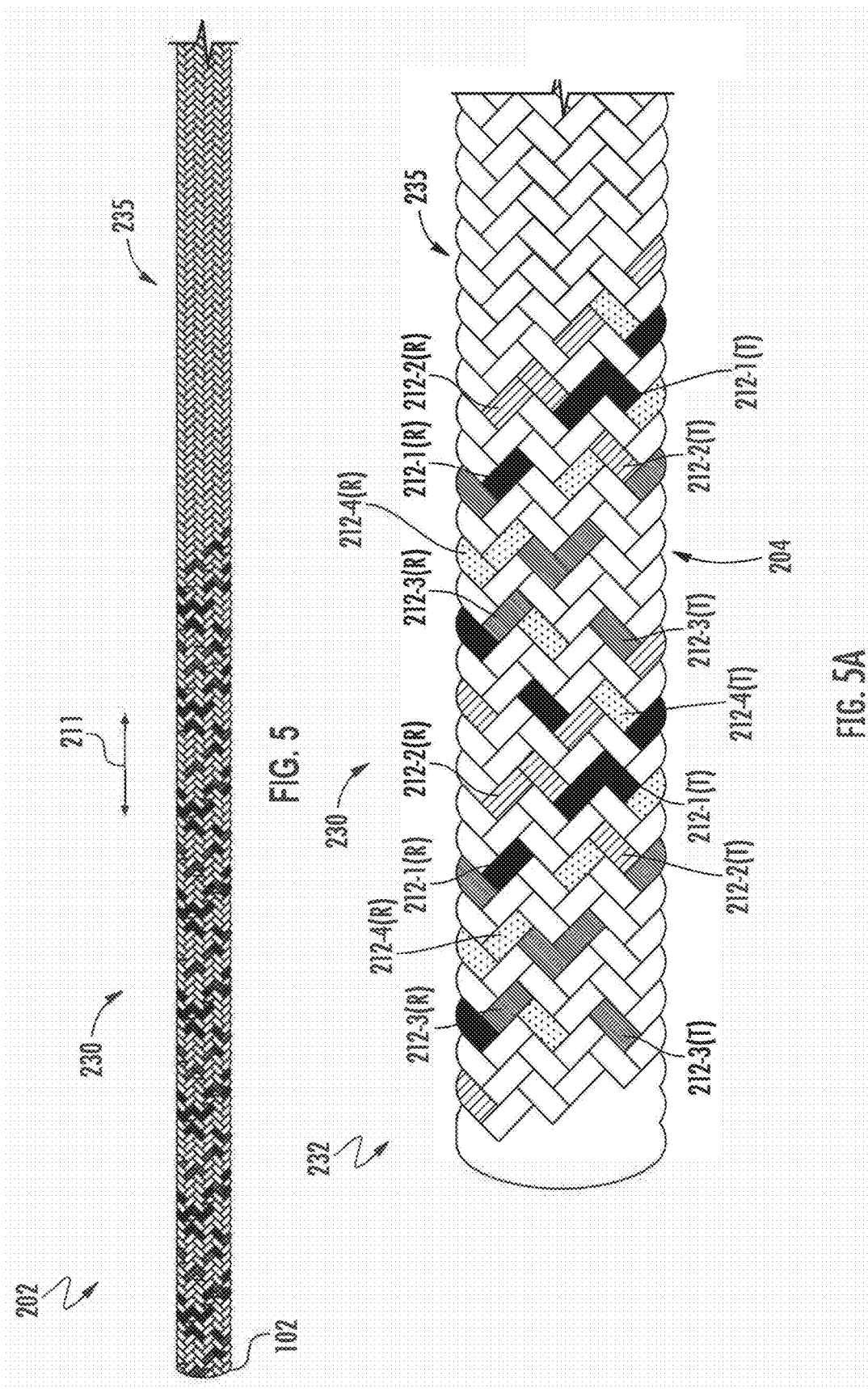

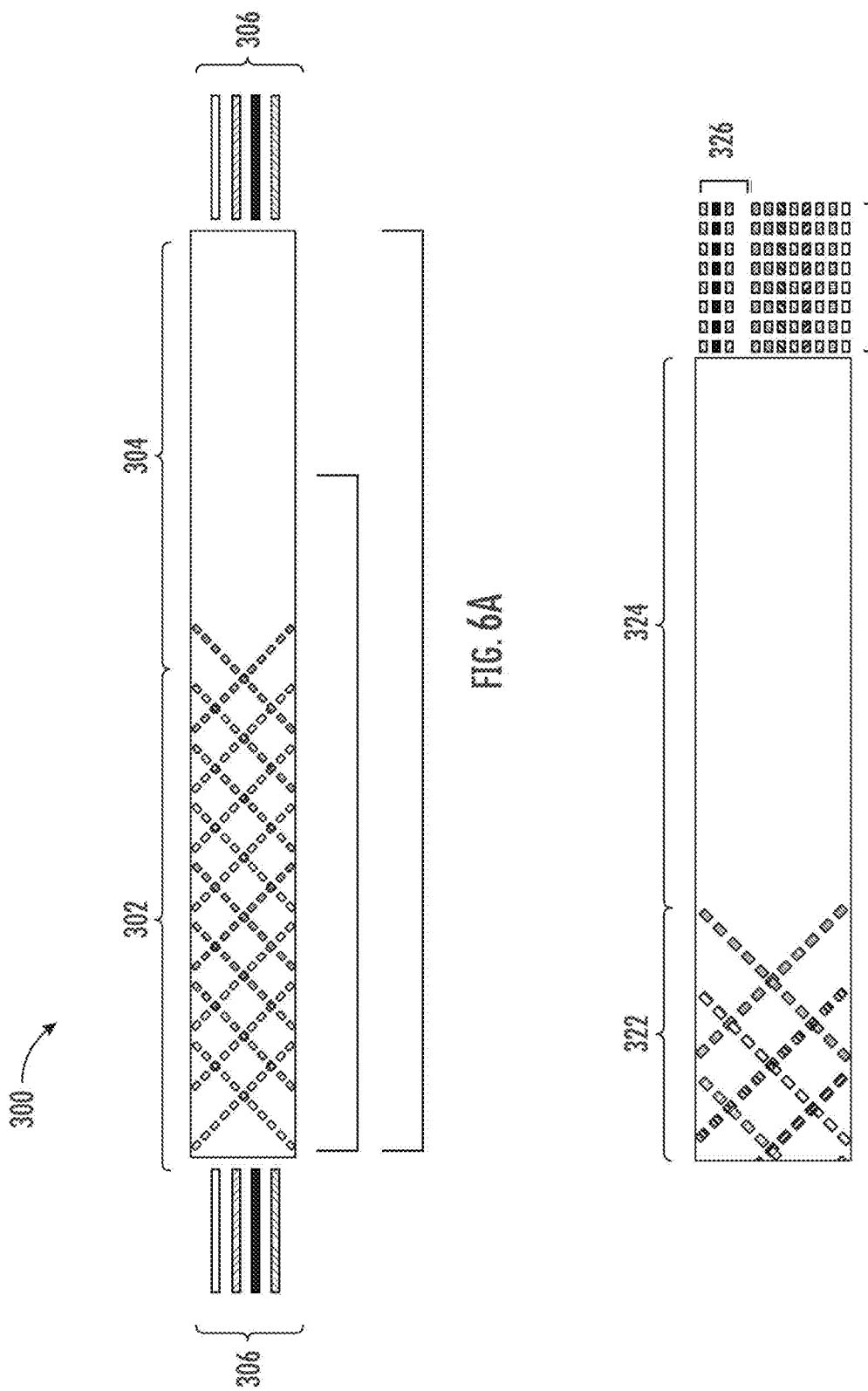

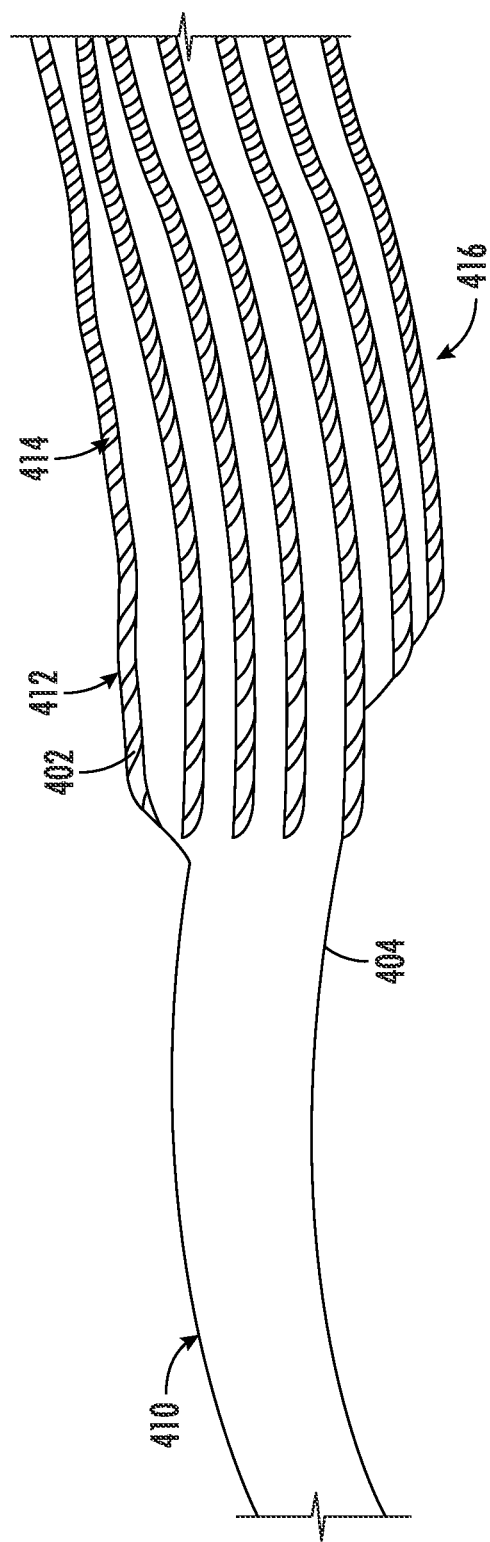

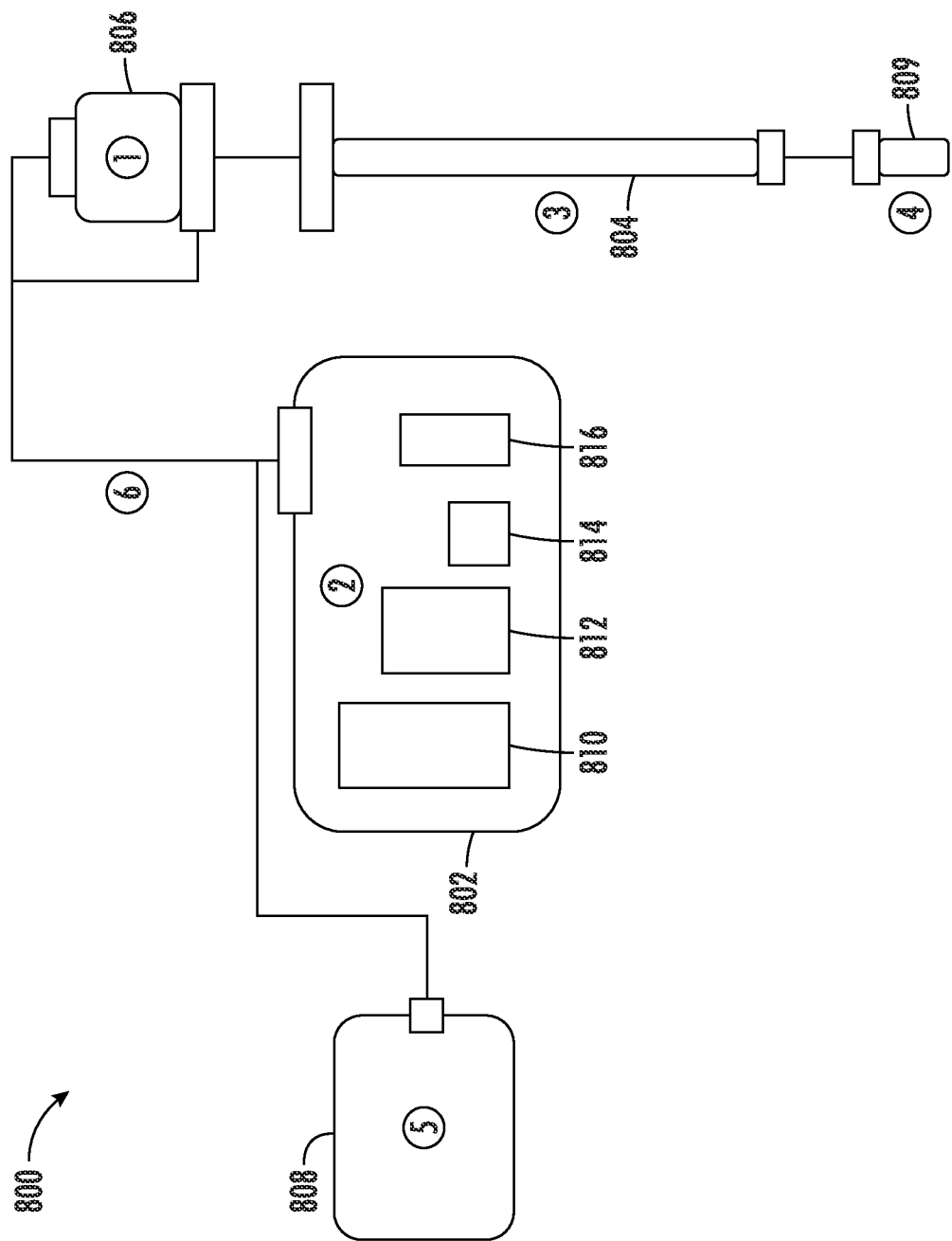

TOUCH-SENSITIVE CORD

CROSS-REFERENCE TO RELATED APPLICATIONS

The present application is based upon and claims the right of priority under 35 U.S.C. § 371 to International Application No. PCT/US2021/046813 filed on Aug. 20, 2021, which is based on and claims benefit of U.S. Provisional Patent Application Ser. No. 63/068,742, filed Aug. 21, 2020. Applicant claims priority to and the benefit of each of such applications and incorporates all such applications herein by reference in its entirety.

FIELD

The present disclosure relates generally to interactive objects including touch-sensors.

BACKGROUND

In-line controls for cords are common for devices including earbuds or headphones for music players, cellular phone usage, and so forth. Similar in-line controls are also used by cords for household appliances and lighting, such as clocks, lamps, radios, fans, and so forth. Generally, such in-line controls utilize unfashionable hardware buttons attached to the cord which can break after extended use of the cord. Conventional in-line controls also have problems with intrusion due to sweat and skin, which can lead to corrosion of internal controls and electrical shorts. Further, the hardware design of in-line controls limits the overall expressiveness of the interface, in that increasing the amount of controls requires more hardware, leading to more bulk and cost.

Accordingly, there remains a need for cords that can provide an adequate interface for controlling devices. Additionally, there remains a need for manufacturing processes that can efficiently and effectively manufacture such objects.

SUMMARY

Aspects and advantages of embodiments of the present disclosure will be set forth in part in the following description, or may be learned from the description, or may be learned through practice of the embodiments.

Aspects of the present disclosure are directed to an interactive cord. The interactive cord can include a plurality of non-conductive lines and a plurality of conductive lines at least partially arranged with one or more of the plurality of non-conductive lines to form at least a portion of the interactive cord. The interactive cord can include an outer layer. The plurality of conductive lines is arranged together with the one or more of the plurality of non-conductive lines along a first longitudinal portion of the interactive cord to form a touch-sensitive area along the first longitudinal portion of the interactive cord. The plurality of conductive lines can be arranged along a second longitudinal portion of the interactive cord such that the plurality of conductive lines are not exposed along an outer surface of the outer layer to form a non-touch-sensitive area along the second longitudinal portion of the interactive cord. The plurality of conductive lines is arranged together with the one or more of the plurality of non-conductive lines along a third longitudinal portion. The second longitudinal portion can be arranged between the first longitudinal portion and the third longitudinal portion with respect to a longitudinal direction of the interactive cord. The third longitudinal portion can be open along the longitudinal direction to form a pair longitudinal edges of the outer layer that extend in the longitudinal direction of the interactive cord.

Another aspect of the present disclosure is directed to an interactive cord including a plurality of non-conductive lines and a plurality of conductive lines braided together with one or more of a plurality of non-conductive lines to form an outer layer. The plurality of conductive lines can be braided together with the one or more of the plurality of non-conductive lines within a first longitudinal portion of the interactive cord to form a touch-sensitive area along the first longitudinal portion of the outer surface. The touch-sensitive area can include at least one first section having a first braided pattern and at least one second section having a second braided pattern that is distinct from the first braided pattern. The at least one second section can border the at least one first section.

Another aspect of the present disclosure is directed to a method for forming an interactive cord. The method can include forming a plurality of conductive lines together with one or more of a plurality of non-conductive lines to form a touch-sensitive area within a first longitudinal portion of a braid; forming the plurality of conductive lines together with the one or more of the plurality of non-conductive lines within a second longitudinal portion of the braid such that the plurality of conductive lines are not exposed along an outer surface of the outer layer to form a non-touch-sensitive area within the second longitudinal portion of the braid; forming the plurality of conductive lines together with the one or more of the plurality of non-conductive lines within a third longitudinal portion such that the third longitudinal portion is open along a longitudinal direction to form a pair longitudinal edges of the outer layer that extend in the longitudinal direction of the braid, and wherein the second longitudinal portion is arranged between the first longitudinal portion and the third longitudinal portion with respect to the longitudinal direction of the braid; and cutting the plurality of conductive lines and the plurality of non-conductive lines to separate an interactive cord from the braid.

Another aspect of the present disclosure is directed to an interactive cord system. The interactive cord system can include an internal electronics module; an aglet comprising one or more electronic components; and an interactive cord coupled to the internal electronics module and the aglet, the interactive cord comprising an internal conductive line extending through the interactive cord, the internal conductive line having a first end connected with the internal electronics module and a second end connected with the one or more electronic components of the aglet.

Another aspect of the present disclosure is directed to an interactive object including at least one object, an internal electronics module, an interactive cord coupled to the internal electronics module and the aglet, the interactive cord comprising an internal conductive line extending through the interactive cord, the internal conductive line having a first end connected with the internal electronics module and a second end connected with the one or more electronic components of the aglet.

Other example aspects of the present disclosure are directed to a system including an interactive cord and at least one processor and at least one tangible, non-transitory computer-readable medium that stores instructions that, when executed by the at least one processor, cause the at least one processor to perform operations. The operations can include detecting a change in a self-capacitance between one or more of the plurality of conductive lines during a user gesture.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 illustrates an example of a conductive thread in accordance with example embodiments of the present disclosure.

FIG. 5 illustrates an example of an interactive cord including a touch-sensitive area and a non-touch-sensitive area in accordance with example embodiments of the present disclosure.

FIG. 5A illustrates an example of an interactive cord including a touch-sensitive area and a non-touch-sensitive area in accordance with example embodiments of the present disclosure.

FIG. 6A is simplified schematic illustration of a first longitudinal portion and a second longitudinal portion of an interactive cord according to aspects of the present disclosure.

FIG. 6B is another simplified schematic illustration of a first longitudinal portion and a second longitudinal portion of an interactive cord according to aspects of the present disclosure.

FIG. 8B illustrates a portion of the interactive cord of FIG. 8A.

FIG. 12 is a simplified schematic illustration of a system including an interactive cord according to aspects of the present disclosure.

DETAILED DESCRIPTION

Figure 1:
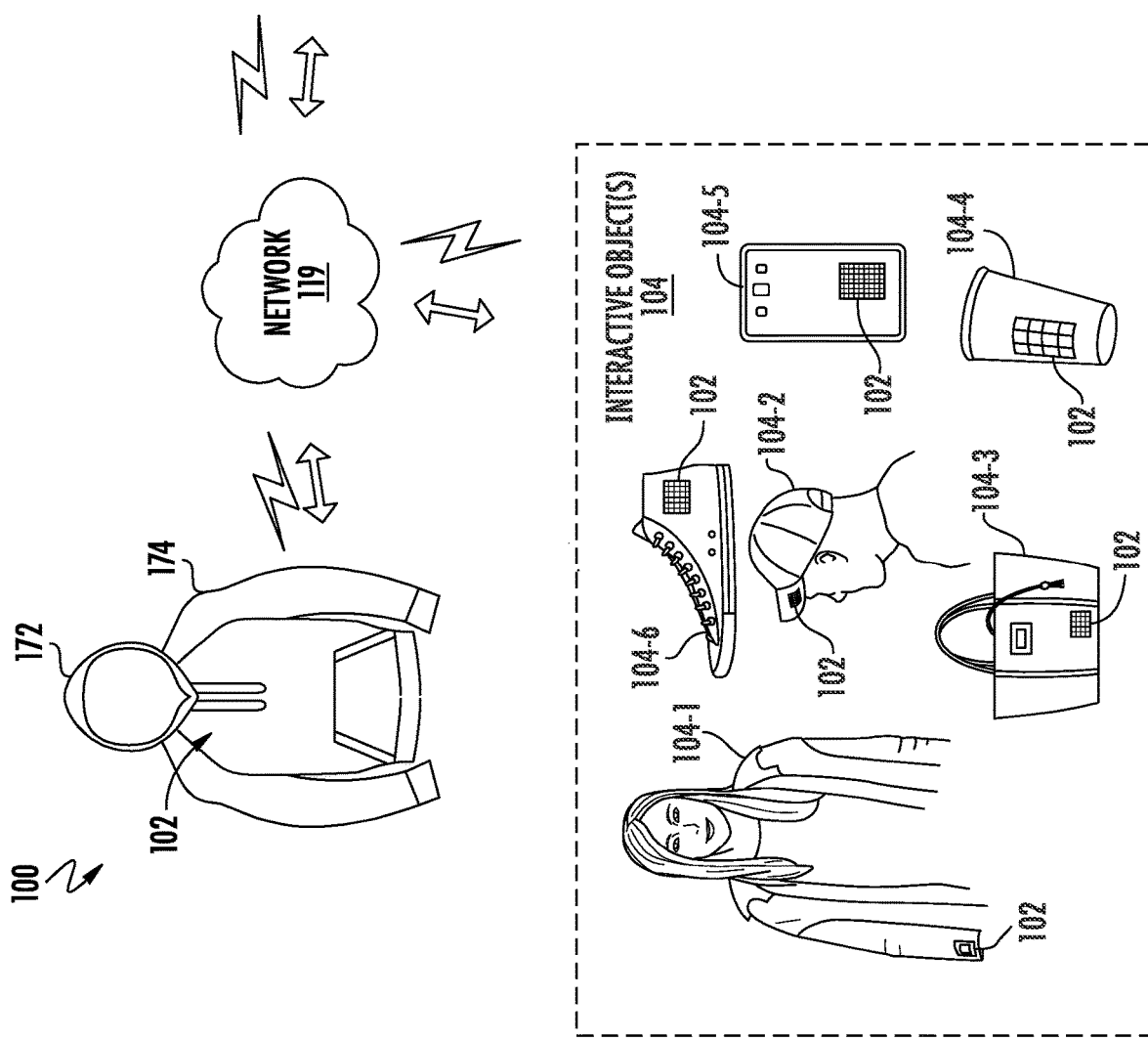
FIG. 1 illustrates an example of a computing environment including an interactive cord in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to an interactive cord that includes one or more selective touch-sensitive areas having conductive lines configured to detect user input, and one or more non-touch-sensitive areas where the conductive lines are configured to be inhibited from detecting user input. One or more braiding processes can be used to form touch-sensitive area(s) and non-touch-sensitive areas. By way of example, the interactive cord can process a touch-input to generate touch data that is usable to initiate functionality at the interactive cord, or at various remote devices that can be coupled to the interactive cord, either wirelessly or through a wired connection. For instance, the interactive cord may provide a user interface for adjusting the volume of a speaker, controlling playback of a movie on a mobile device, answering a telephone call, etc.

According to example embodiments, an interactive cord can be formed from a plurality of flexible conductive lines and a plurality of flexible non-conductive lines. The flexible conductive lines may include conductive threads (also referred to as yarns), conductive fibers, fiber optic filaments, flexible metal lines, etc. The flexible non-conductive lines may include non-conductive threads or other flexible fibers, filaments, yarns that provide at least partial separation for the conductive lines. The plurality of conductive lines can be arranged together with some or all of the non-conductive lines within a first longitudinal portion of the interactive cord to form a touch-sensitive area within the first longitudinal portion of the interactive cord. The plurality of conductive lines can be arranged together with the non-conductive lines within a second longitudinal portion of the interactive cord such that the plurality of conductive lines are not exposed along an outer surface of the outer layer to form a non-touch-sensitive area within the second longitudinal portion of the interactive cord. The plurality of conductive lines can be arranged together with some or all of the non-conductive lines within a third longitudinal portion. The second longitudinal portion can be arranged between the first longitudinal portion and the third longitudinal portion with respect to a longitudinal direction of the interactive cord. The third longitudinal portion can be open along the longitudinal direction to form a pair longitudinal edges of the outer layer that extend in the longitudinal direction of the interactive cord. The third longitudinal portion can facilitate connection between the interactive cord and a computing system configured to detect user inputs with respect to the interactive cord.

As used herein "braid" can refer to any suitable technique for arranging, interleaving, and/or interlacing the lines together. One example type of braiding is lace-braiding, such as a bobbin-lace-braiding process also referred to as torchon-lace-braiding. However, any suitable process can be used to arrange the lines together form an interactive cord.

The resulting interactive cord may represent an improvement over existing braided or woven structures that include a consistent repetitive pattern that extends along the full length of the interactive cord. An interactive cord with a selective touch-sensitive area may be especially useful to avoid inadvertent inputs from users or external objects such as metallic objects that may come in contact with the cord. By way of example, an interactive cord can be provided as a drawstring for a garment, such as a hooded sweatshirt or a shirt. Selective touch-sensitive areas can be formed at the end portions of the interactive cord that extend from holes that couple the interactive cord to the shirt. The interactive cord can include a non-touch-sensitive area where the interactive cord extends through the shirt at a collar area that extends around a user's neck when worn. In this manner, the interactive cord may include one or more touch-sensitive areas at portions intended to be accessed by a user and one or more non-touch-sensitive areas at other portions where unintended input is to be avoided.

Touch inputs provided via a capacitive touch sensor as described may include various applications and capabilities. By way of example, a touch sensor may be used as a button to detect a simple touch input at a location of the touch sensor. In some examples, a one-dimensional array of conductive threads may be used to implement a touch sensor that can detect a button-type input. A one-dimensional array of conductive threads may also be used to detect a one-dimensional swipe input (e.g., movement in a single direction corresponding to the spacing between threads). In some examples, a multi-dimensional (e.g., two-dimensional) array of conductive threads may be used to implement a touch sensor that can detect trackpad inputs, including a specific location of a touch within a grid of conductive threads. A multi-dimensional capacitive touch sensor including a two-dimensional array of conductive threads may be used to detect various gesture inputs, authentication inputs, predefined keystrokes, movements, user-specific natural behaviors and the like. One or more machine-learned models may be used to detect user inputs based on training the machine-learned models using training data. Additionally, the touch sensor may be configured to detect analog and pseudo-force inputs from a capacitive change caused by a finger distance.

According to some aspects, an external computing device (e.g., smartphone, tablet, laptop, etc.) can be communicatively coupled to an interactive cord using one or more wireless and/or wired interfaces. A gesture manager can be implemented on the computing device to store mappings between gestures and functionalities of the computing device. A functionality mapped to a gesture can be initiated in response to detecting the gesture at the interactive cord. In some examples, an interactive cord can be configured to selectively respond to gestures based on the location of the gesture relative to the capacitive touch sensor.

In some embodiments, the plurality of conductive lines can be woven together with the plurality of non-conductive lines such that the plurality of conductive lines do not intersect each along within the first longitudinal portion of the interactive cord. For example, the plurality of conductive lines can be arranged parallel with respect to each along the outer surface of the outer layer.

In some embodiments, the plurality of conductive lines can form a helical pattern with respect to the longitudinal direction of the interactive cord. The helical pattern has a pitch angle with respect to the longitudinal direction of the interactive cord. In some embodiments, the pitch angle can be less than about 30 degrees, in some embodiments less than about 20 degrees, in some embodiments less than about 15 degrees, in some embodiments less than about 10 degrees, in some embodiments less than about 5 degrees, and in some embodiments less than about 3 degrees. The above configurations can be configured to provide improved detection of user inputs via self-capacitance of the conductive lines of the interactive cord.

In some embodiments, the interactive cord can include an aglet electrically connected with the internal conductive line. The aglet can include a light-emitting element electrically connected with one or more conductive lines of the interactive cord, such as an internal conductive line that is not exposed along an outside of the interactive cord.

In some embodiments, at least some of the plurality of conductive lines can be exposed along an outer surface of the outer layer within the first longitudinal portion of the interactive cord, for example, to form one or more touch-sensitive areas within the first longitudinal portion. For instance, one or more of the conductive lines can be insulated. Respective insulation layer can be formed over the conductive lines to prevent direct electrical connection between the conductive lines and another object, such as a user's finger. In such embodiments, the insulation layers of the conductive lines can be exposed along the outer surface of the outer layer within the first longitudinal portion of the interactive cord. However, in other embodiments, some or all of the conductive lines can be free of insulating layers.

In some embodiments, the touch-sensitive area can include at least one first section having a first braided pattern and at least one second section having a second braided pattern that is distinct from the first braided pattern. The first section(s) can border respective second section(s), for instance in an alternating pattern. This configuration can facilitate detection of user inputs that include movement of a user's hand or finger along the longitudinal direction of the interactive cord. Examples of such user inputs can include a sliding or swiping gesture along the interactive cord.

In some embodiments, the plurality of conductive lines can be free of intersections with each other within the first braided pattern and/or the second braided pattern. As one example, a first set of conductive lines of the plurality of conductive lines are exposed in the first braided pattern, and a second set of conductive lines of the plurality of conductive lines are exposed in the second braided pattern. The second set of conductive lines can be different from the first set of conductive lines. This configuration can produce different electrical signals when a user touches the first braided pattern as compared with the second braided pattern, thereby facilitating detecting of a sliding or swiping gesture.

As one example, the first braided pattern can have a helical pattern and a first pitch angle, and the second braided pattern can have a different helical pattern and a second pitch angle. The first braided pattern can include a helical pattern, and the second braided pattern can include parallel conductive lines that are aligned with the longitudinal direction of the interactive cord and/or do not wrap around the interactive cord. For example, alternating first sections and second sections can be provided along the interactive cord.

In some embodiments, the touch-sensitive area can include additional sections with respective braided patterns. The additional sections can be provided in alternation with the first and second sections. For instance, three or more respective sections can be repeated in a pattern along the longitudinal direction of the interactive cord. For instance, the touch-sensitive area can include at least one third section having a third braided pattern that differs from each of the first braided pattern and the second braided pattern.

In some embodiments, the system can include a light-emitting element, such as a light-emitting diode or light-emitting line. For example, the aglet can include a light-emitting diode. As another example, the interactive cord can include a light-emitting line. The system can be configured to illuminate the light-emitting diode and/or line in a variety of circumstances and/or in response to various user inputs. For example, the computing system can illuminate the light-emitting diode and/or line to confirm that a user input was detected with respect to the interactive cord, to prompt the user to provide a certain input with respect to the interactive cord, or the like.

Aspects of the present disclosure are directed to a method for forming an interactive cord. For example, the method can include braiding a plurality of conductive lines together with one or more of a plurality of non-conductive lines to form a touch-sensitive area within a first longitudinal portion of a braid. The plurality of conductive lines can be arranged together with the plurality of non-conductive lines within a second longitudinal portion of the braid such that the plurality of conductive lines are not exposed along an outer surface of the outer layer to form a non-touch-sensitive area within the second longitudinal portion of the braid. The method can include braiding the plurality of conductive lines together with the plurality of non-conductive lines within a third longitudinal portion such that the third longitudinal portion is open along a longitudinal direction to form a pair longitudinal edges of the outer layer that extend in the longitudinal direction of the braid. The second longitudinal portion can be arranged between the first longitudinal portion and the third longitudinal portion with respect to the longitudinal direction of the braid. The plurality of conductive lines and the plurality of non-conductive lines can be cut at a first location that intersects the third longitudinal portion of the braid to separate an individual interactive cord from the braid.

In some embodiments, the method can provide improved manufacturing of interactive cords by allowing multiple individual interactive cords to be manufactured and cut from a single arranged cord. For example, the conductive lines can be arranged together with the non-conductive lines to form multiple individual interactive cords along a continuous cord. As braiding of each individual interactive cord is finished, it can be cut from the cord. For example, a fourth longitudinal portion, a fifth longitudinal portion, and a sixth longitudinal portion can be braided in the cord to form a second individual interactive cord that generally corresponds with the first individual interactive cord.

According to aspects of the present disclosure, a computing system can include an interactive cord, at least one processor, and at least one tangible, non-transitory computer-readable medium that stores instructions that, when executed by the at least one processor, cause the at least one processor to perform operations. The operations can include detecting a change in a self-capacitance between one or more of the plurality of conductive lines of the interactive cord, for example caused by a user gesture.

Systems and methods in accordance with the disclosed technology provide a number of technical effects and benefits. Typical integrations of conductive lines within interactive objects may not facilitate a large number of input gestures or the selective placement of touch-sensitive areas. For instance, a traditional interactive cord using conductive threads may be formed with a consistent repetitive pattern along the entire outer surface of the interactive cord. Such a design has considerable drawbacks and limitations. For example, the use of a repetitive pattern does not allow a significant number of gestures to be interpreted. For example, a particular location of touch within the interactive cord may not be possible. A touch at any portion of a conductive line may be detected but a location of the touch may be undetermined. Additionally, the conductive threads typically extend along the entire outer length of the interactive cord. In this manner, it is not possible to selectively form touch-sensitive areas. Accordingly, it is likely that inadvertent inputs will be received by the interactive cord at locations that are not desired.

Embodiments of the disclosed technology provide a number of technical effects and benefits particularly with respect to increasing a number of potential input gestures as well as selectively forming touch-sensitive areas. By way of example, the braiding technique can be used whereby conductive lines are selectively formed and exposed on the outer surface of the interactive cord. In this manner, selective formation of touch-sensitive areas can be achieved. This can facilitate better integration of interactive cords within items, such as garments. For example, a particular location for a touch-sensitive area on a shoestring or drawstring can be formed. This can avoid the detection of inadvertent inputs by a user or external object at other locations along the interactive cord that are not desirable.

Aspects of the present disclosure are directed to various items that include interactive cords. Examples or such items include garments, household fixtures, household appliances, and the like. Example garments can include t-shirts, sweatshirts, coats, jackets, shoes, boots, and the like. Example household fixtures can include lighting fixtures, ceiling fans, and any other suitable household fixtures. Example household appliances can include lamps, such as desktop lamps, floor-standing lamps and the like.

Figure 2:
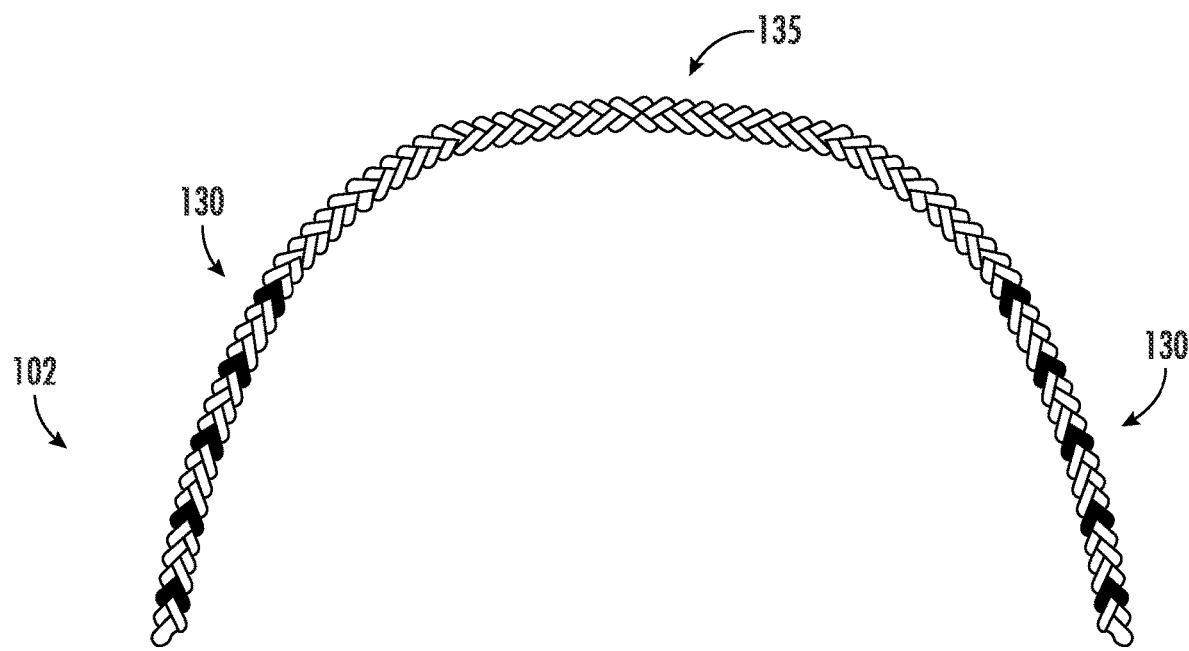
FIG. 2 illustrates an example of a computing environment including an interactive cord in accordance with example embodiments of the present disclosure.

FIG. 1 is an illustration of an example environment 100 in which techniques using, and objects including, an interactive cord in accordance with example embodiments may be implemented. Environment 100 includes an interactive cord 102, which is illustrated as a drawstring for a hoodie or other wearable garment in this particular example. FIG. 2 illustrates an enlarged, simplified view of the interactive cord 102. More particularly, the interactive cord 102 can be formed as a drawstring that extends around a hood 172 of the garment 174. Interactive cord 102 includes one or more touch-sensitive areas 130 including conductive lines configured to detect user input and one or more non-touch-sensitive areas 135 where the conductive lines are configured to not detect touch input due to capacitive sensing. In example computing environment 100, interactive cord 102 includes two touch-sensitive areas 130 and one non-touch-sensitive area 135. It is noted that any number of touch-sensitive areas 130 and/or non-touch-sensitive areas 135 may be included in interactive cord 102. Interactive cord 102 can include touch-sensitive areas 130 where the interactive cord extends from an enclosure of the hood and can include a non-touch-sensitive area 135 where interactive cord 102 wraps around a neck opening of the hood of the garment. In this manner, inadvertent inputs by contact of the user's neck or other portion of their skin with the interactive cord extending around the neck portion can be avoided.

While interactive cord 102 may be described as a cord or string for a garment or accessory, it is to be noted that interactive cord 102 may be utilized for various different types of uses, such as cords for appliances (e.g., lamps or fans), USB cords, SATA cords, data transfer cords, power cords, headset cords, or any other type of cord. In some examples, interactive cord 102 may be a standalone device. For instance, interactive cord 102 may include a communication interface that permits data indicative of input received at the interactive cord to be transmitted to one or more remote computing endpoints, such as a cellphone, personal computer, or cloud computing device. In some implementations, an interactive cord 102 may be incorporated within an interactive object. For example, an interactive cord may form the drawstring of a shirt (e.g., hoodie) or pants, shoe laces, etc.

Interactive cord 102 enables a user to control an interactive object such as garment 174 that the interactive cord 102 is integrated with, or to control a variety of other computing devices 106 via a network 119. Computing devices 106 are illustrated with various non-limiting example devices: server 106-1, smart watch 106-2, tablet 106-3, desktop 106-4, camera 106-5, smart phone 106-6, and computing spectacles 106-7, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

The interactive cord can be included in a variety of objects. Such can include "flexible" objects, such as a shirt 104-1, a hat 104-2, a handbag 104-3 and a shoe 104-6. It is to be noted, however, that touch sensor 102 may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Touch sensor 102 may be integrated within flexible objects 104 in a variety of different ways, including braiding, weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Touch sensor 102 may be integrated within hard objects 104 using a variety of different manufacturing processes. In one or more implementations, injection molding is used to integrate touch sensors into hard objects 104.

Network 119 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

The interactive cord(s) 102 can interact with computing devices 106 by transmitting touch data or other sensor data through network 119. Computing device 106 uses the touch data to control computing device 106 or applications at computing device 106. As an example, consider that interactive cord 102 integrated at garment 174 may be configured to control the user's smart phone 106-6 in the user's pocket, desktop 106-4 in the user's home, smart watch 106-2 on the user's wrist, or various other appliances in the user's house, such as thermostats, lights, music, and so forth. For example, the user may be able to swipe up or down on interactive cord 102 integrated within the user's garment 174 to cause the volume on a television to go up or down, to cause the temperature controlled by a thermostat in the user's house to increase or decrease, or to turn on and off lights in the user's house. Note that any type of touch, tap, swipe, hold, or stroke gesture may be recognized by interactive cord 102.

Figure 3:
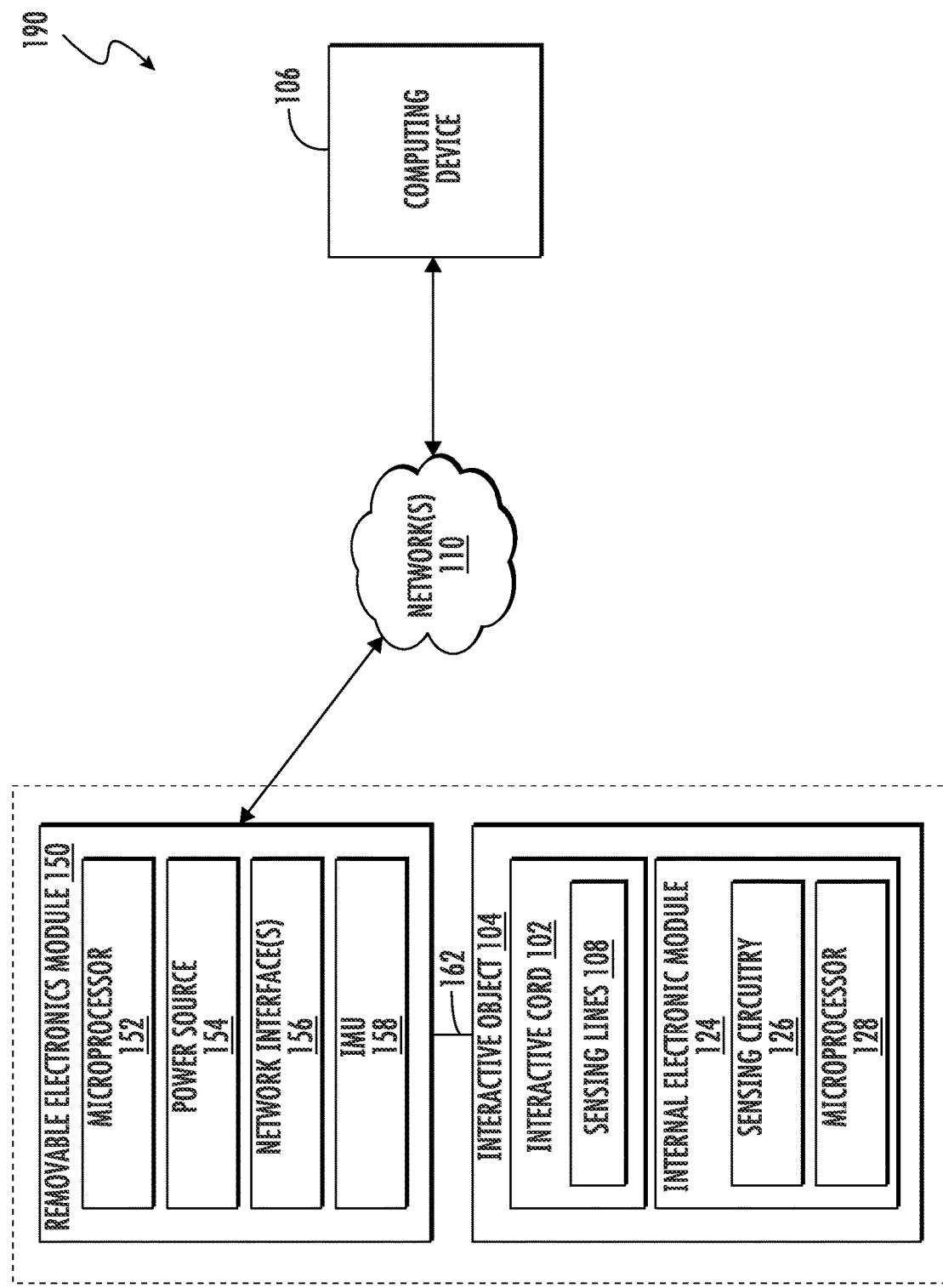
FIG. 3 illustrates an example of an interactive cord in accordance with example embodiments of the present disclosure.

In more detail, consider FIG. 3 which illustrates an example system 190 that includes an interactive object 104, a removable electronics module 150, and a computing device 106. In system 190, interactive cord 102 is integrated in an object 104, which may be implemented as a flexible object (e.g., shirt 104-1, hat 104-2, or handbag 104-3) or a hard object (e.g., plastic cup 104-4 or smart phone casing 104-5).

Interactive cord 102 is configured to sense touch-input from a user when one or more fingers of the user's hand touch or approach interactive cord 102. Interactive cord 102 may be configured as a capacitive touch sensor or resistive touch sensor to sense single-touch, multi-touch, and/or full-hand touch-input from a user. To enable the detection of touch-input, interactive cord 102 includes sensing lines 108, which can be formed as a grid, array, or parallel pattern so as to detect touch input. In some implementations, the sensing lines 108 do not alter the flexibility of interactive cord 102, which enables interactive cord 102 to be easily integrated within interactive objects 104.

Interactive object 104 includes an internal electronics module 124 that is embedded within interactive object 104 and is directly coupled to sensing lines 108. Internal electronics module 124 can be communicatively coupled to a removable electronics module 150 via a communication interface 162. Internal electronics module 124 contains a first subset of electronic circuits or components for the interactive object 104, and removable electronics module 150 contains a second, different, subset of electronic circuits or components for the interactive object 104. As described herein, the internal electronics module 124 may be physically and permanently embedded within interactive object 104, whereas the removable electronics module 150 may be removably coupled to interactive object 104.

In system 190, the electronic components contained within the internal electronics module 124 includes sensing circuitry 126 that is coupled to sensing lines 108 that form a portion of the interactive cord 102. In some examples, the internal electronics module includes a flexible printed circuit board (PCB). The printed circuit board can include a set of contact pads for attaching to the conductive lines. In some examples, the printed circuit board includes a microprocessor 128. For example, wires from conductive threads may be connected to sensing circuitry 126 using flexible PCB, creping, gluing with conductive glue, soldering, and so forth. In one embodiment, the sensing circuitry 126 can be configured to detect a user-inputted touch-input on the conductive threads that is pre-programmed to indicate a certain request. In one embodiment, when the conductive threads form a grid or other pattern, sensing circuitry 126 can be configured to also detect the location of the touch-input on sensing line 108, as well as motion of the touch-input. For example, when an object, such as a user's finger, touches sensing line 108, the position of the touch can be determined by sensing circuitry 126 by detecting a change in capacitance on the grid or array of sensing line 108. The touch-input may then be used to generate touch data usable to control a computing device 106. For example, the touch-input can be used to determine various gestures, such as pinch, double pinch, hold, rotate/spin, single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

Internal electronics module 124 can include various types of electronics, such as sensing circuitry 126, sensors (e.g., capacitive touch sensors woven into the garment, microphones, or accelerometers), output devices (e.g., LEDs, speakers, or micro-displays), electrical circuitry, and so forth. Removable electronics module 150 can include various electronics that are configured to connect and/or interface with the electronics of internal electronics module 124. Generally, the electronics contained within removable electronics module 150 are different than those contained within internal electronics module 124, and may include electronics such as microprocessor 152, power source 154 (e.g., a battery), network interface 156 (e.g., Bluetooth or WiFi), sensors (e.g., accelerometers, heart rate monitors, pedometers, IMUs), output devices (e.g., speakers, LEDs), and so forth.

In some examples, removable electronics module 150 is implemented as a strap or tag that contains the various electronics. The strap or tag, for example, can be formed from a material such as rubber, nylon, plastic, metal, or any other type of fabric. Notably, however, removable electronics module 150 may take any type of form. For example, rather than being a strap, removable electronics module 150 could resemble a circular or square piece of material (e.g., rubber or nylon).

The inertial measurement unit(s) (IMU(s)) 158 can generate sensor data indicative of a position, velocity, and/or an acceleration of the interactive object. The IMU(s) 158 may generate one or more outputs describing one or more three-dimensional motions of the interactive object 104. The IMU(s) may be secured to the internal electronics module 124, for example, with zero degrees of freedom, either removably or irremovably, such that the inertial measurement unit translates and is reoriented as the interactive object 104 is translated and are reoriented. In some embodiments, the inertial measurement unit(s) 158 may include a gyroscope or an accelerometer (e.g., a combination of a gyroscope and an accelerometer), such as a three axis gyroscope or accelerometer configured to sense rotation and acceleration along and about three, generally orthogonal axes. In some embodiments, the inertial measurement unit(s) may include a sensor configured to detect changes in velocity or changes in rotational velocity of the interactive object and an integrator configured to integrate signals from the sensor such that a net movement may be calculated, for instance by a processor of the inertial measurement unit, based on an integrated movement about or along each of a plurality of axes.

Communication interface 162 enables the transfer of power and data (e.g., the touch-input detected by sensing circuitry 126) between the internal electronics module 124 and the removable electronics module 260. In some implementations, communication interface 162 may be implemented as a connector that includes a connector plug and a connector receptacle. The connector plug may be implemented at the removable electronics module 150 and is configured to connect to the connector receptacle, which may be implemented at the interactive object 104.

In system 190, the removable electronics module 150 includes a microprocessor 152, power source 154, and network interface 156. Power source 154 may be coupled, via communication interface 162, to sensing circuitry 126 to provide power to sensing circuitry 126 to enable the detection of touch-input, and may be implemented as a small battery. When touch-input is detected by sensing circuitry 126 of the internal electronics module 124, data representative of the touch-input may be communicated, via communication interface 162, to microprocessor 152 of the removable electronics module 150. Microprocessor 152 may then analyze the touch-input data to generate one or more control signals, which may then be communicated to a computing device 106 (e.g., a smart phone, server, cloud computing infrastructure, etc.) via the network interface 156 to cause the computing device to initiate a particular functionality. Generally, network interfaces 156 are configured to communicate data, such as touch data, over wired, wireless, or optical networks to computing devices. By way of example and not limitation, network interfaces 156 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 110 of FIG. 1 and FIG. 2).

Object 104 may also include one or more output devices configured to provide a haptic response, a tactical response, an audio response, a visual response, or some combination thereof. Similarly, removable electronics module 206 may include one or more output devices configured to provide a haptic response, tactical response, and audio response, a visual response, or some combination thereof. Output devices may include visual output devices, such as one or more light-emitting diodes (LEDs), audio output devices such as one or more speakers, one or more tactile output devices, and/or one or more haptic output devices. In some examples, the one or more output devices are formed as part of removable electronics module, although this is not required. In one example, an output device can include one or more LEDs configured to provide different types of output signals. For example, the one or more LEDs can be configured to generate a circular pattern of light, such as by controlling the order and/or timing of individual LED activations. Other lights and techniques may be used to generate visual patterns including circular patterns. In some examples, one or more LEDs may produce different colored light to provide different types of visual indications. Output devices may include a haptic or tactile output device that provides different types of output signals in the form of different vibrations and/or vibration patterns. In yet another example, output devices may include a haptic output device such as may tighten or loosen an interactive garment with respect to a user. For example, a clamp, clasp, cuff, pleat, pleat actuator, band (e.g., contraction band), or other device may be used to adjust the fit of a garment on a user (e.g., tighten and/or loosen). In some examples, an interactive textile may be configured to tighten a garment such as by actuating conductive threads within the interactive cord 102.

A gesture manager is capable of interacting with applications at computing devices 106 and interactive cord 102 effective to aid, in some cases, control of applications through touch-input received by interactive cord 102. For example, a gesture manager can interact with applications. A gesture manager can be implemented at removable electronics module 150, internal electronics module 124, a computing device 106 remote from the interactive object, or some combination thereof. A gesture manager may be implemented as a standalone application in some embodiments. In other embodiments, a gesture manager may be incorporated with one or more applications at a computing device.

A gesture or other predetermined motion can be determined based on touch data detected by the interactive cord 102 and/or an inertial measurement unit 158 or other sensor. For example, a gesture manager can determine a gesture based on touch data, such as single-finger touch gesture, a double-tap gesture, a two-finger touch gesture, a swipe gesture, and so forth. As another example, a gesture manager can determine a gesture based on movement data such as a velocity, acceleration, etc. as can be determined by inertial measurement unit 158.

A functionality associated with a gesture can be determined by gesture manager and/or an application at a computing device. In some examples, it is determined whether the touch data corresponds to a request to perform a particular functionality. For example, the gesture manager determines whether touch data corresponds to a user input or gesture that is mapped to a particular functionality, such as initiating a vehicle service, triggering a text message or other notification associated with a vehicle service, answering a phone call, creating a journal entry, and so forth. As described throughout, any type of user input or gesture may be used to trigger the functionality, such as swiping, tapping, or holding interactive cord 102. In one or more implementations, a gesture manager enables application developers or users to configure the types of user input or gestures that can be used to trigger various different types of functionalities. For example, a gesture manager can cause a particular functionality to be performed, such as by sending a text message or other communication, answering a phone call, creating a journal entry, increase the volume on a television, turn on lights in the user's house, open the automatic garage door of the user's house, and so forth.

While internal electronics module 124 and removable electronics module 150 are illustrated and described as including specific electronic components, it is to be appreciated that these modules may be configured in a variety of different ways. For example, in some cases, electronic components described as being contained within internal electronics module 124 may be at least partially implemented at the removable electronics module 150, and vice versa. Furthermore, internal electronics module 124 and removable electronics module 150 may include electronic components other that those illustrated in FIG. 3, such as sensors, light sources (e.g., LED's), displays, speakers, and so forth.

Interactive cord 102 enables a user to control an object 104 with which the interactive cord 102 is integrated, or to control a variety of other computing devices 106 via a network 110. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers). Computing device 106 may be a local computing device, such as a computing device that can be accessed over a bluetooth connection, near-field communication connection, or other local-network connection. Computing device 106 may be a remote computing device, such as a computing device of a cloud computing system.

Network 110 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Interactive cord 102 can interact with computing devices 106 by transmitting touch data or other sensor data through network 110. Additionally or alternatively, interactive cord 102 may transmit gesture data, movement data, or other data derived from sensor data generated by the interactive cord 102. Computing device 106 can use the touch data to control computing device 106 or applications at computing device 106. As an example, consider that interactive cord 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on interactive cord 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by interactive cord 102.

FIG. 4 illustrates an example 177 of a conductive line in accordance with one or more embodiments. In example 177, conductive line 112 is a conductive thread. The conductive thread includes a conductive wire 118 that is combined with one or more flexible threads 116. Conductive wire 118 may be combined with flexible threads 116 in a variety of different ways, such as by twisting flexible threads 116 with conductive wire 118, wrapping flexible threads 116 with conductive wire 118, braiding or weaving flexible threads 116 to form a cover that covers conductive wire 118, and so forth. Conductive wire 118 may be implemented using a variety of different conductive materials, such as copper, silver, gold, aluminum, or other materials coated with a conductive polymer. Flexible thread 116 may be implemented as any type of flexible thread or fiber, such as cotton, wool, silk, nylon, polyester, and so forth.

Combining conductive wire 118 with flexible thread 116 causes conductive line 112 to be flexible and stretchy, which enables conductive line 112 to be easily arranged with one or more non-conductive lines 110 (e.g., cotton, silk, or polyester) to form outer cover 104. Alternately, in at least some implementations, outer cover 104 can be formed using only conductive lines 112.

FIG. 5A illustrates an example 202 of an interactive cord 102 in accordance with example embodiments of the present disclosure. In this example, interactive cord 102 includes a touch-sensitive area 230 adjacent to a non-touch-sensitive area 235. Interactive cord 202 defines a longitudinal direction 211 along its length. Interactive cord 102 includes a plurality of conductive lines implemented as a plurality of conductive threads 212. Interactive cord 102 includes a plurality of non-conductive lines implemented as a plurality of non-conductive threads 210. Conductive threads 212 are selectively braided with the non-conductive threads 210 using two or more thread patterns to selectively define touch-sensitive area 230 for the interactive cord 102. One or more first braiding patterns may be used to form a touch-sensitive area 230 corresponding to a first longitudinal portion of the interactive cord. At the touch-sensitive area 230, conductive threads 212 are selectively exposed at the outer cover 204 of the cord to facilitate the detection of touch input a from capacitive touch points. One or more second braiding patterns can be used to form a non-touch-sensitive area 235 at a second longitudinal portion of the interactive cord 102.

The outer cover 204 may be formed by braiding conductive threads 212 with a first subset of non-conductive threads 210 at the first longitudinal portion of the interactive cord corresponding to the touch-sensitive area 230. The inner core (not shown) of the interactive cord may include a second subset of non-conductive lines at the first longitudinal portion. Optionally, the inner core may also include additional conductive lines that are not exposed at the touch-sensitive area. The second subset of non-conductive lines sensitive may or may not be braided within the inner core at the non-touch-sensitive area. At a second longitudinal portion of the interactive cord corresponding to the non-touch-sensitive area 235, the plurality of conductive threads 212 can be positioned within the inner core such that one or more of the non-conductive threads provide separation to inhibit the conductive threads from detecting touch due to capacitive coupling.

The outer cover at the second longitudinal portion can be formed by braiding the first subset of non-conductive threads and one or more additional non-conductive threads. For instance, one or more of the second subset of non-conductive threads can be routed to the outer cover at the second longitudinal portion and braided with the first subset of the non-conductive threads. In this manner, the interactive cord may include a uniform braiding appearance while using multiple braiding patterns to selectively form touch-sensitive areas. For example, the number of additional non-conductive threads braided with the first subset of non-conductive threads can be equal to the number of conductive threads such that the braiding pattern will appear to be uniform in both the touch-sensitive area 230 and non-touch-sensitive area 235. It is noted that the coloring or pattern of the individual conductive threads shown in FIG. 5A is optional. For example, the conductive threads may be formed with the same color thread as the non-conductive threads such that the interactive cord will have a uniform colored appearance across its entirety.

Within the touch-sensitive area 230, the braiding pattern of outer cover 204 exposes conductive threads 212 at capacitive touchpoints 208 along outer cover 204. Conductive threads 212 are covered and hidden from view at other areas of cover 204 due to the braiding pattern. Touch input to any of capacitive touchpoints 208 causes a change in capacitance to corresponding conductive thread(s) 212, which may be detected by sensing circuitry 182. However, touch input to other areas of outer cover 204 formed by non-conductive threads 210 does not cause a change (or a significant change) in capacitance to conductive threads 212 that is detected as an input. At the non-touch-sensitive area 235, the conductive threads can be formed within the inner core (not shown) such that touch within the non-touch-sensitive area 235 is not registered as an input.

As illustrated in the close-up view 232 of FIG. 5A, the plurality of conductive threads 212 can include threads of different types of electrodes that form capacitive sensors that use a mutual capacitance sensing technique. For example, a first group of conductive threads can form transmitter threads 212-1(T), 212-2(T), 212-3(T), and 212-4(T) and a second group of the conductive threads can form receiver threads 212-1(R), 212-2(R), 212-3(R), and 212-4(R). The transmitter threads work as the transmitters of the capacitive sensors, while the receiver threads work as the receivers of the capacitive sensors. The touch sensor can be configured as a grid having rows and columns of conductors that are exposed in the outer cover that the form capacitive touch points 208. In a mutual-capacitance sensing technique, the transmitter threads are configured as driving lines, which carry current, and the receiver threads are configured as sensing lines, which detect capacitance at nodes inherently formed in the grid at each intersection.

For example, proximity of an object close to or at the surface of the outer cover 204 that includes capacitive touchpoints 208 may cause a change in a local electrostatic field, which reduces the mutual capacitance at that location. The capacitance change at every individual node on the grid may thus be detected to determine "where" the object is located by measuring the voltage in the other axis. For example, a touch at or near a capacitive touchpoint may decrease the distance between a pair of transmitter and receiver lines, thereby causing a detectable change in capacitance at one or more of the transmitter and receiver lines.

In the example of FIG. 5A, the outer cover 204 is formed by braiding conductive threads in opposite circumferential directions using so-called "S" threads and "Z" threads. A first group of one or more S threads can be wrapped in a first circumferential direction (e.g., clockwise) around the interactive cord and a second group of one or more Z threads can be wrapped in a second circumferential direction (e.g., counterclockwise) around the interactive cord at a longitudinal portion of the interactive cord including a touch sensor. In this particular example, a set of four S threads are utilized to form the transmitter threads 212-1(T), 212-2(T), 212-3(T), and 212-4(T) and a set of four Z threads are utilized to form the receiver threads 212-1(R), 212-2(R), 212-3(R), and 212-4(R). The S transmitter threads 212-1(T), 212-2(T), 212-3(T), and 212-4(T) are wrapped circumferentially in the clockwise direction. The Z receiver threads 212-1(R), 212-2(R), 212-3(R), and 212-4(R) are wrapped circumferentially in the counterclockwise direction. It is noted that the transmitter threads may be wrapped circumferentially in the counterclockwise direction as Z threads and the receiver threads may be wrapped circumferentially in the clockwise direction as S threads in an alternative embodiment. Moreover, it is noted that the use of four transmitter threads and four receiver threads is provided by way of example only. Any number of conductive threads may be utilized.

The S conductive threads and Z conductive threads cross each other to form capacitive touch points 208. In some examples, the equivalent of a touchpad on the outer cover of the interactive cord 102 can be created. A mutual capacitance sensing technique can be used whereby one of the groups of S or Z threads are configured as transmitters of the capacitive sensor while the other group of S or Z threads are configured as receivers of the capacitive sensor. When a user's finger touches or is in proximity to an intersection of a pair of the Z and S threads, the location of the touch can be detected from the mutual capacitance sensor that includes the pair of transmitter and receiver conductive threads. Controller 117 can be configured to detect the location of a touch input in such examples by detecting which transmitter and/or receiver thread is touched. For example, the controller can distinguish a touch to a first transmitter conductive thread (e.g., 212-1(T)) from a touch to a second transmitter conductive thread 212-2(T), third transmitter conductive thread 212-3(T), or a fourth transmitter conductive thread 212-(T). Similarly, the controller can distinguish a touch to a first receiver thread (e.g., 212-1(R)) from a touch to a second receiver thread 212-2(R), third receiver thread 212-4(R), or a fourth receiver thread 212-4(R). In this example, sixteen distinct types of capacitive touch points can be formed based on different pairs of S and Z threads. As will be described hereinafter, a non-repetitive braiding pattern can be used to provide additional detectable inputs in some examples. For example, the braiding pattern can be changed to provide different sequences of capacitive touchpoints that can be detected by the controller 117.

Additionally and/or alternatively, a braiding pattern can be used to expose the conductive threads for attachment to device pins or contact pads for an internal electronics module or other circuitry. For example, a particular braiding pattern may be used that brings the conductive threads to the surface of the interactive cord where the conductive threads can be accessed and attached to various electronics. The conductive threads can be aligned at the surface for easy connectorization.

Figure 5B:
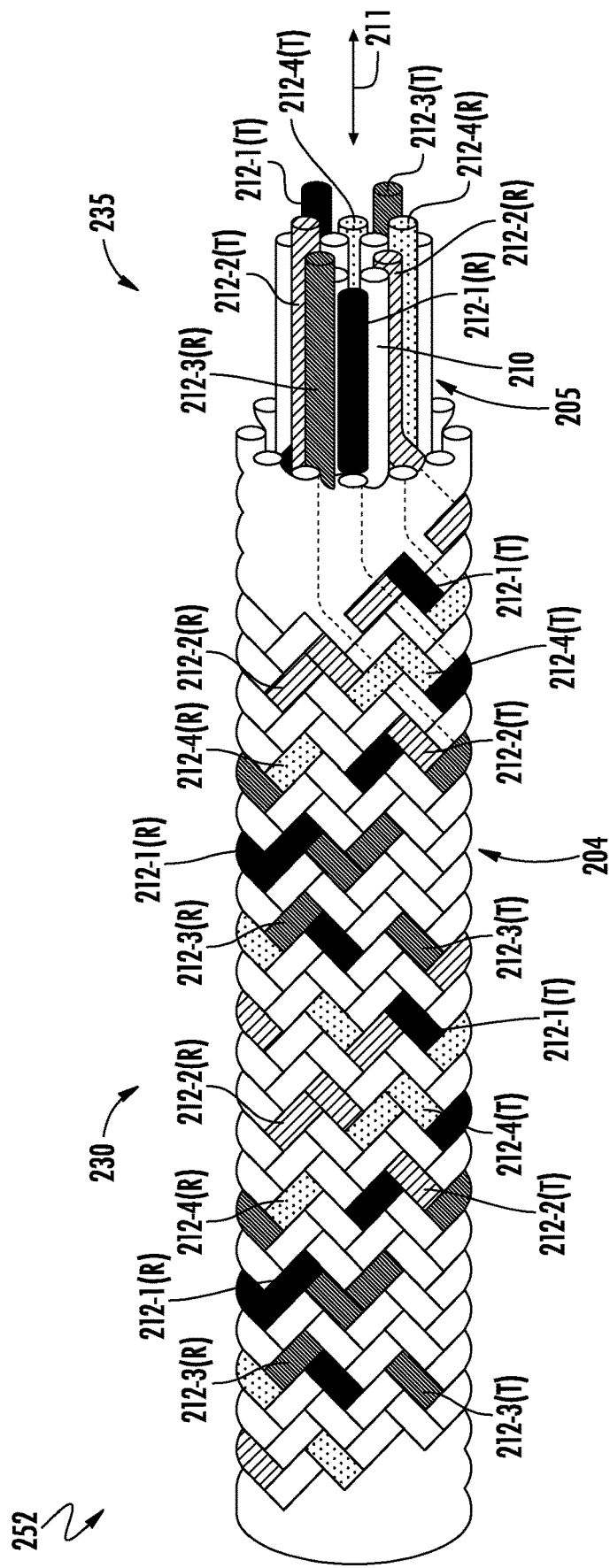
FIG. 5B illustrates an example of an interactive cord including an outer cover and an inner core in accordance with example embodiments of the present disclosure.

FIG. 5B illustrates an additional example 252 of an interactive cord 102, depicting the outer cover 204 at the touch-sensitive area 230, and the inner core 205 at non-touch-sensitive area 235. At touch-sensitive area 230, conductive threads 212-1(T), 212-2(T), 212-3(T), 212-4(T), 212-1(R), 212-2(R), 212-3(R), and 212-4(R) are braided with a first subset of non-conductive threads 210 to form the outer cover 204 at the touch-sensitive area 230. At the touch-sensitive area 230, the conductive threads are selectively exposed on the outer cover to form capacitive touch points 208 for the capacitive touch sensor. A first braiding pattern may be used to form the outer cover at the touch-sensitive area 230 so as to expose portions of the conductive threads.

At the non-touch-sensitive area 235, the conductive threads are routed to the inner core 205 of the interactive cord 102. The inner core 205 is illustrated in a cutout view where the outer cover has been removed for illustrative purposes. As illustrated, each conductive threads 212-1(T), 212-2(T), 212-3(T), 212-4(T), 212-1(R), 212-2(R), 212-3(R), and 212-4(R) is positioned within the inner core. Additionally, some non-conductive threads are positioned within the inner core to provide separation between individual ones of the conductive threads within the inner core. Although not shown, the outer cover 204 at the non-touch-sensitive area 235 can be formed by braiding the first subset of non-conductive threads with an additional subset of non-conductive threads so a uniform braiding pattern appearance is achieved.

Various braiding processes can be used to controllably braid the conductive threads to selectively form touch-sensitive area 230 for interactive cord 102. A lace-braiding process can be used in some embodiments, such as a bobbin-lace-braiding process, also referred to as torchon-lace-braiding process. In a bobbin-lace-braiding process, a plurality of flexible lines (e.g., conductive threads and non-conductive threads) can be provided on a plurality of individually-controllable bobbins. A computer-controlled process can be applied to control the bobbins and thereby braid the plurality of flexible threads using a plurality of different braiding patterns to selectively form a touch-sensitive area for a capacitive touch sensor. For instance, a first braiding pattern may be applied to form touch-sensitive area 230 by braiding one or more conductive thread 212 with one or more non-conductive threads 210 to form the outer cover 204 at a first longitudinal portion of the interactive cord for touch-sensitive area 230. A second braiding pattern may be applied to form a non-touch-sensitive area 235 by braiding only non-conductive threads 210 to form the outer cover 204 at a second longitudinal portion of the interactive cord. The second braiding pattern may position the conductive threads at the inner core 205 of the interactive cord. The conductive threads may be braided or unbraided within the inner core 205. The non-conductive threads that are braided to form the outer cover 204 at the non-touch-sensitive area provide a separation distance between the conductive threads 212 and an external touch. A uniform braiding appearance can be provided by utilizing a total number of non-conductive threads 210 and conductive threads 212 to form the outer cover at the first longitudinal portion that is equal to a total number of non-conductive threads 210 used to form the outer cover 204 at the second longitudinal portion for the non-touch-sensitive area 235.

It is noted that the braiding pattern of the conductive threads can be varied within a touch-sensitive area or for different touch-sensitive areas. Referring back to FIG. 4, the transmitter conductive threads are formed using a first repeating thread order (left to right in the longitudinal direction of the interactive cord 102): 212-4(T), 212-3(T), 212-2(T), and 212-1(T). The receiver conductive threads are formed in a second repeating thread order: 212-1(R), 212-2(R), 212-3(R), 212-4(R). Together the order of braiding the conductive threads defines a first braiding pattern.

A second braiding pattern is shown in FIG. 5A. The transmitter conductive threads are formed in a third repeating thread order: 212-1(T), 212-3(T), 212-2(T), 212-4(T).

The receiver conductive threads are formed in a fourth repeating thread order: 212-1(R), 212-4(R), 212-2(R), 212-3(R). Together the order of braiding the transmitter and receiver threads defines a second braiding pattern.

Figure 5C:
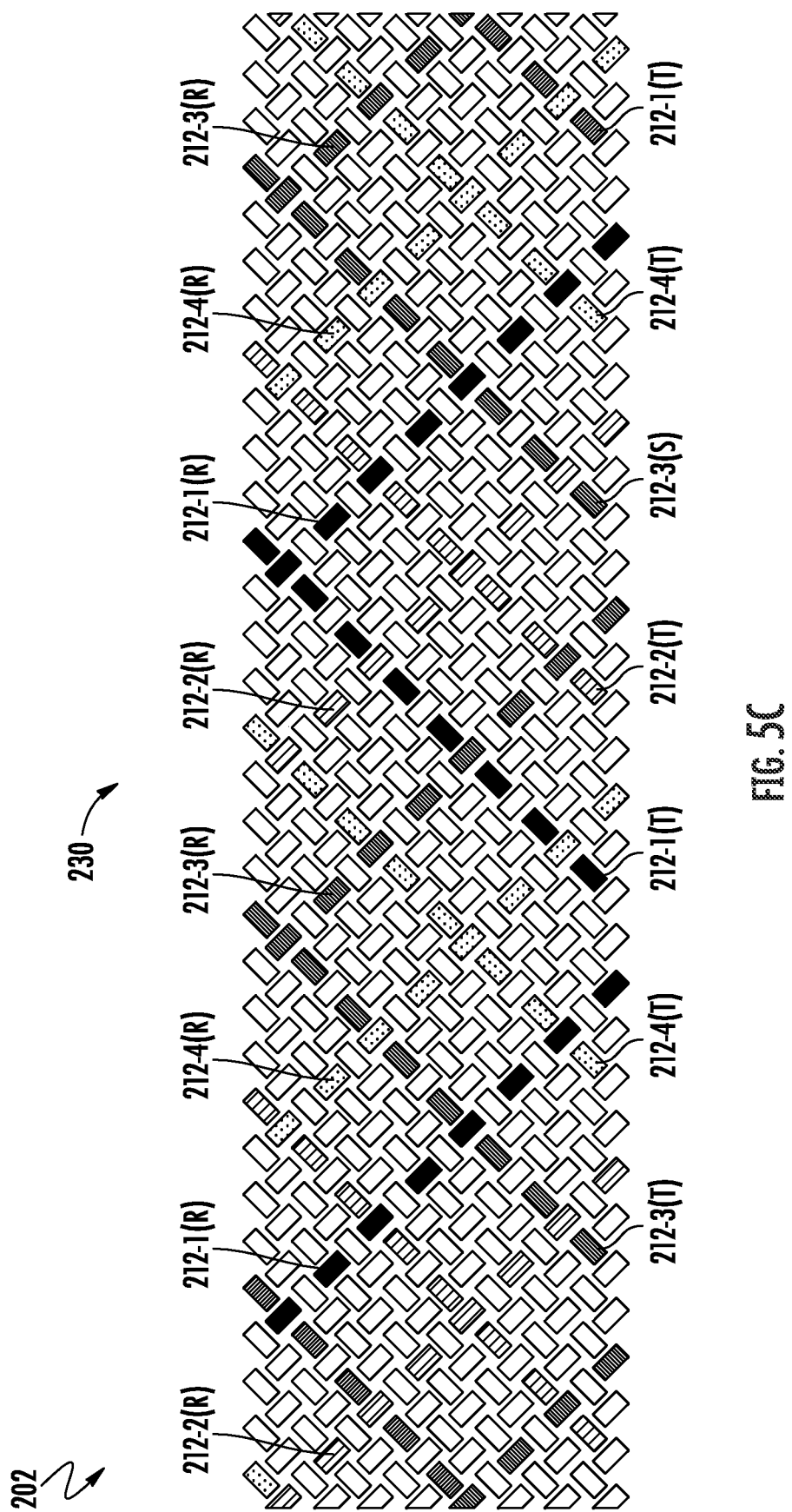
FIG. 5C illustrates an example of an interactive cord including an outer cover and an inner core in accordance with example embodiments of the present disclosure.

FIG. 5C illustrates a third example 262 of an interactive cord 102 including a touch-sensitive area 230. In example 262, interactive cord 102 includes at least one substantially flat or planar surface. Multiple braiding patterns can be used to form such an interactive cord to achieve selective touch-sensitive areas, as well as to define non-repetitive patterns for detecting touch inputs. In FIG. 5C, a third braiding pattern is illustrated. In this example, the transmitter conductive threads are formed using a fifth repeating thread pattern: 212-1(T), 212-2(T), 212-3(T), 212-4(T). The receiver conductive threads are formed using a sixth repeating thread pattern: 212-4(R), 212-3(R), 212-2(R), 212-1(R). Together the order of braiding the transmitter and receiver conductive threads defines a third braiding pattern.

FIG. 6A is simplified schematic illustration of a first longitudinal portion 302 and a second longitudinal portion 304 of an interactive cord according to aspects of the present disclosure. A touch-sensitive area can be formed along the first longitudinal portion 302 and a non-touch-sensitive area can be formed along the second longitudinal portion 304. The interactive cord 300 can include a plurality of internal conductive lines 306 that are not exposed along an outer surface of the first longitudinal portion 302 and/or the second longitudinal portion 304. The internal conductive lines 306 can extend through the interactive cord without being exposed along the outer surface of the outer layer within the first longitudinal portion 302 and/or the second longitudinal portion 304 of the interactive cord 300.

FIG. 6B is another simplified schematic illustration of a first longitudinal portion 322 and a second longitudinal portion 324 of an interactive cord according to aspects of the present disclosure. A touch-sensitive area can be formed along the first longitudinal portion 322 and a non-touch-sensitive area can be formed along the second longitudinal portion 322. The interactive cord can include a plurality of internal conductive lines 326 that are not exposed along an outer surface of the first longitudinal portion 322 and/or the second longitudinal portion 324. The internal conductive lines 326 can extend through the interactive cord without being exposed along the outer surface of the outer layer within the first longitudinal portion 322 and/or the second longitudinal portion 324 of the interactive cord 300.

Figure 6D:
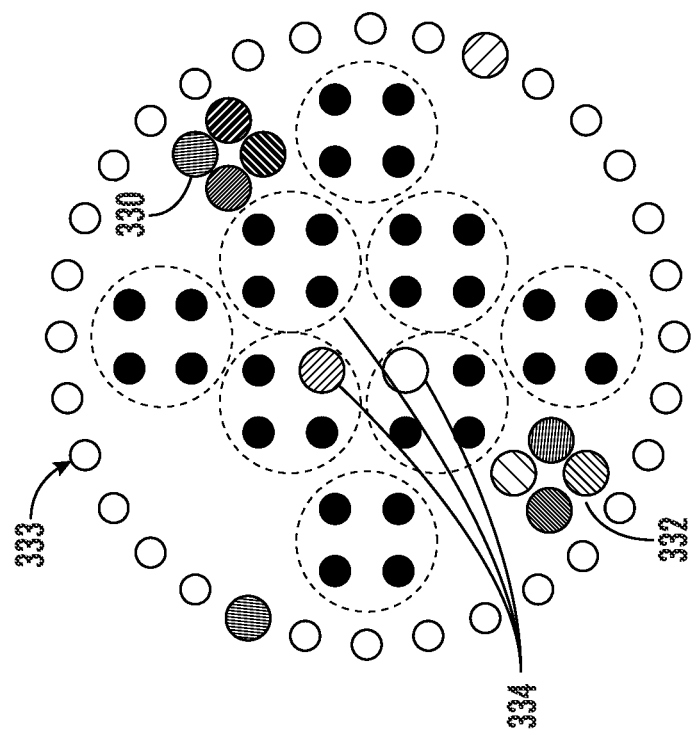
FIG. 6D is a simplified cross-sectional schematic of a second longitudinal portion of the interactive cord of FIG. 6C according to aspects of the present disclosure.
Figure 6C:
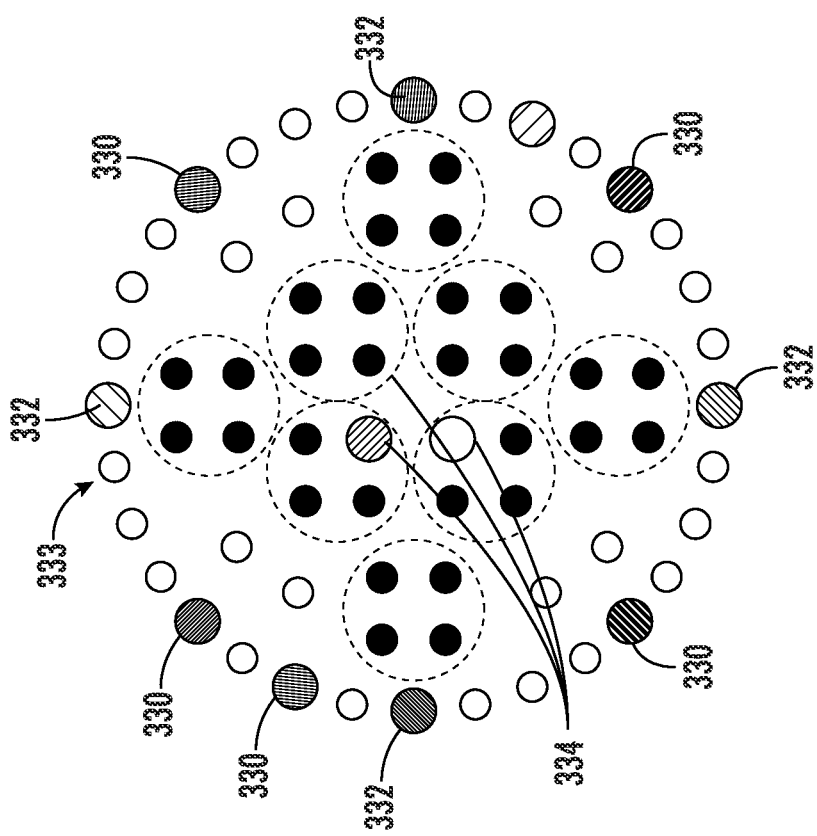
FIG. 6C is a simplified cross-sectional schematic of a first longitudinal portion of an interactive cord according to aspects of the present disclosure.

FIG. 6C is a simplified cross-sectional schematic of a first longitudinal portion of an interactive cord. The first longitudinal portion can include a touch-sensitive area. A first group of conductive lines 330 and second group of conductive lines 332 can be exposed along an outside surface of an outer layer 333 of the interactive cord in the first longitudinal portion One or more internal conductive lines 334 extend through the interactive cord without being exposed along the outer surface of the outer layer 332 of the first longitudinal portion of the interactive cord. The first group of conductive lines 330 can be arranged (e.g., braided) such that the conductive lines 330 warp around in the interactive cord in a first direction (e.g., a "Z" direction). The second group of conductive lines 332 can be arranged (e.g., braided) such that the conductive lines 332 warp around in the interactive cord in a second direction that is opposite to the first direction (e.g., an "S" direction). The first group of conductive lines 330 can each be configured as a transmission line, while the second group of conductive lines 332 can each be configured as a sensing line in a mutual capacitance sensing configuration. Conversely the first group of conductive lines 330 can each be configured as a receiving line, while the second group of conductive lines 332 can each be configured as a sensing line in the mutual capacitance sensing configuration.

FIG. 6D is a simplified cross-sectional schematic of a second longitudinal portion of an interactive cord. The second longitudinal portion can include a non-touch-sensitive area. The first group of conductive lines 330 and the second group of conductive lines 332 can be inside the outer layer 333 such that the conductive lines 330, 332 are not exposed along the outer surface of the outer layer 333 along the second longitudinal portion of the interactive cord. For example, the first group of conductive lines 330 can be grouped together with each other within the outer layer 333. The second group of conductive lines 332 can be grouped together with each other within the outer layer 333. However, it should be understood the conductive lines 330, 332 can be arranged with any suitable configuration within the outer layer 333.

Figure 7:
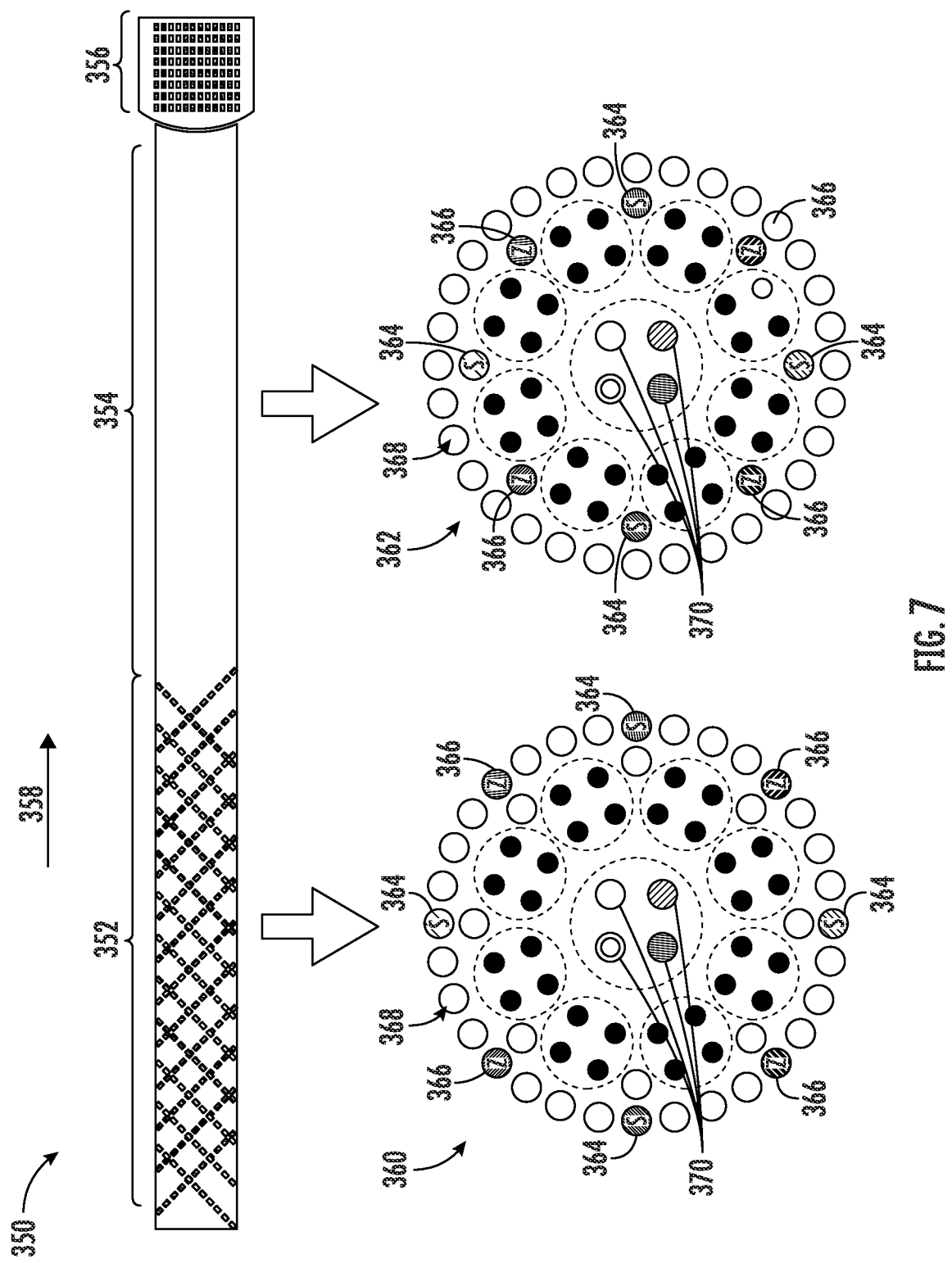
FIG. 7 illustrates an interactive cord including a first longitudinal portion. a second longitudinal portion, and a third longitudinal portion according to aspects of the present disclosure.

FIG. 7 illustrates an interactive cord 350 including a first longitudinal portion 352. a second longitudinal portion 354, and a third longitudinal portion 356. The first longitudinal portion 352 can include a touch-sensitive area. The second longitudinal portion 354 can include a non-touch-sensitive area. Third longitudinal portion 356 can be open along a longitudinal direction 358 to form a pair longitudinal edges of the outer layer that extend in the longitudinal direction of the interactive cord, for example corresponding with the third longitudinal portion 412 described below with reference to FIG. 8A.

FIG. 7 includes a first cross-sectional view 360 of the first longitudinal portion 352 of the interactive cord 350 and a second cross-section 362 of the second longitudinal portion 354 of the interactive cord 350. A first group of conductive lines 364 and second group of conductive lines 366 can be exposed along an outer surface of the outer layer 368 of the interactive cord along the first longitudinal portion as shown in the first cross-section view 360. A plurality of internal conductive lines 370 extend through the interactive cord along the first longitudinal portion 352 without being exposed along the outer surface of the outer layer 368 of the interactive cord.

Referring to the second cross-section 362 of the second longitudinal portion 354 of the interactive cord 350, the conductive lines 364, 366 can be located within the inner core of the interactive cord. The conductive lines 364, 366 can be spaced apart within the interactive cord 350 as compared with the respective groups of conductive lines 330, 332 of FIG. 6D. Thus, instead of the first group of conductive lines 364 being clustered together with each other, and the second group of conductive lines 366 being clustered together with each other as described above with reference to FIG. 6D, in some embodiments the conductive lines 364, 366 can be spaced apart with respect to each other. In some embodiments the first group of conductive lines 364 can be arranged in alternation with the second group of conductive lines 366 within the interactive cord 350.

As indicated above, in some embodiments first group of conductive lines 364 can be arranged (e.g., braided) such that the conductive lines 364 warp around in the interactive cord in a first direction (e.g., an "S" direction). The second group of conductive lines 332 can be arranged and/or braided such that the conductive lines 366 warp around in the interactive cord in a second direction that is opposite to the first direction (e.g., a "Z" direction). The first group of conductive lines 330 can each be configured as a transmission line, while the second group of conductive lines 332 can each be configured as a sensing line in a mutual capacitance sensing configuration. Conversely, the first group of conductive lines 330 can each be configured as a receiving line, while the second group of conductive lines 332 can each be configured as a sensing line in the mutual capacitance sensing configuration.

Figure 8A:
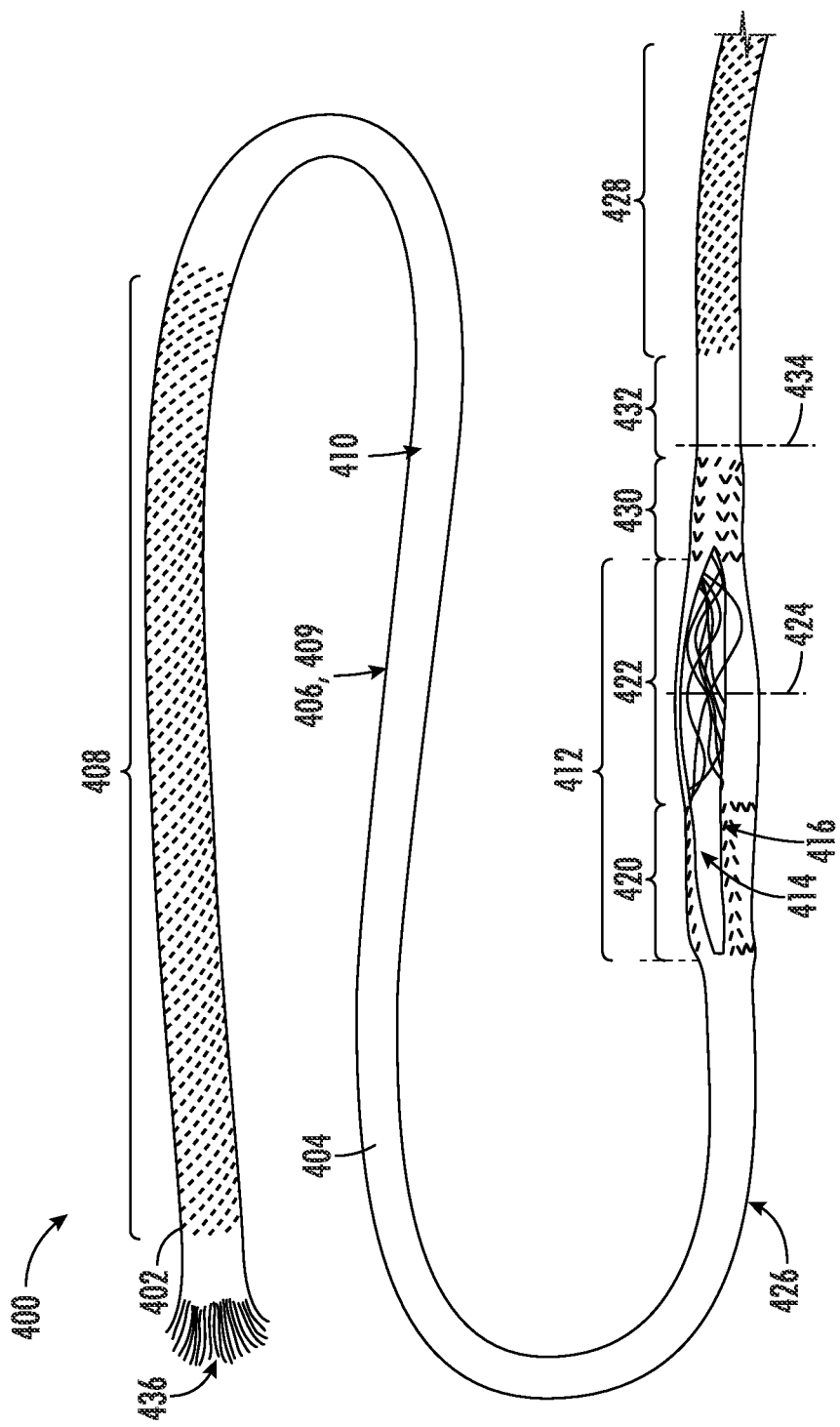
FIG. 8A illustrates an embodiment of an interactive cord according to aspects of the present disclosure.

FIG. 8A illustrates a cord 400 according to aspects of the present disclosure. The interactive cord 400 can include a plurality of conductive lines 402 arranged together with one or more of a plurality of non-conductive lines 404 to form an outer layer 406. The cord 400 can be configured for detecting changes in self-capacitance between the plurality of conductive lines 402. The plurality of conductive lines 402 can be arranged together with the one or more of the plurality of non-conductive lines 404 along a first longitudinal portion 408 of the interactive cord 400 to form a touch-sensitive area along the first longitudinal 408 portion of the interactive cord 400. The conductive lines 402 can be arranged parallel with respect to each other along an outer surface 409 of the interactive cord 400. In some embodiments, the conductive lines 402 do not intersect each other along the outer surface 409. In some embodiments, one or more internal conductive lines can be arranged within the inner core of the interactive cord. The internal conductive lines can be not exposed along the outer surface 409 of the outer layer 406 along the first longitudinal portion 408 and/or the second longitudinal portion 410 of the interactive cord 400.

The plurality of conductive lines 402 can be arranged together with non-conductive lines 404 along a second longitudinal portion 410 of the interactive cord 400 such that the plurality of conductive lines 402 are not exposed along an outer surface 409 of the outer layer 406 to form a non-touch-sensitive area within the second longitudinal portion 410 of the interactive cord 400. For example, the conductive lines 402 can be spatially separated inwardly in a radial direction with respect to the outer surface 409 of the outer layer 406 (for example as described above with reference to the conductive lines 330, 332 of FIGS. 6C and/or the conductive lines 364, 366 in the second cross-section 362 of FIG. 7). The conductive lines 364, 366 can be arranged within an inner core of the interactive cord 400. The conductive lines 402 can be located within the outer layer 406 along the second longitudinal portion 410. The conductive lines 402 may or may not be braided with each other and/or one or more of the non-conductive lines 404 along the second longitudinal portion 410. For instance, along the second longitudinal portion of 410, the plurality of conductive lines 402 can be positioned within an inner core such that one or more of the non-conductive lines 404 provide separation to inhibit the conductive lines 402 from detecting touch due to capacitive coupling (e.g., with a user's hand or finger along the outer surface 409 of the outer layer 406).

The plurality of conductive lines 402 can be arranged together with the plurality of non-conductive lines 404 along at least a portion of a third longitudinal portion 412. The second longitudinal portion 410 can be arranged between the first longitudinal portion 408 and the third longitudinal portion 412 with respect to a longitudinal direction of the interactive cord 400. The third longitudinal portion 412 can be open along the longitudinal direction to form a pair longitudinal edges 414, 416 of the outer layer that extend in the longitudinal direction of the interactive cord. As indicated above, the longitudinal direction refers to the direction of an axis running through the center of the interactive cord 400. For example, referring to FIG. 8B, second longitudinal portion 410 can have a generally tubular shape. The outer layer can be opened and flattened in the third longitudinal portion 412.

Referring again to FIG. 8A, the third longitudinal portion 412 can include a first section 420 in which the conductive lines 402 are braided together with the plurality of non-conductive lines 404. The third longitudinal portion 412 can include a second section 422 in which one or more of the conductive lines 402 are separated from (not braided together with) the plurality of non-conductive lines 404. The interactive cord 400 can be cut along a cutting location 424 from an individual interactive cord 426 of the conductive lines 402 arranged together with the plurality of non-conductive lines 404.

The conductive lines 402 can be braided back into the outer layer 406 so that the conductive lines 402 can be arranged into a pre-determined order for connection with an electrical connector or component (e.g., an internal electronics module 806 as described below with reference to FIG. 12). For instance, an order of the conductive lines 402 within the third longitudinal portion 412 can correspond with an order of a plurality of connection pins, terminal, or the like of the electrical connector.

Further, in some embodiments one or more internal conductive lines that are not exposed along the outer surface of the interactive cord 400 can also be braided together in the third longitudinal section. The internal conductive lines can be arranged in an order with respect to the conductive lines 402 as described above for connection with an electrical connector or component.

In some embodiments, the conductive lines 402 and one or more of the non-conductive lines 404 can be braided together in additional longitudinal sections before the interactive cord 400 is cut along the cutting location 424. For example, the conductive lines 402 and non-conductive lines 404 can be arranged together to form additional longitudinal sections respectively corresponding with the first longitudinal section 408, the second longitudinal section 410, and the third longitudinal section 412 (e.g., in the same order and/or configuration). Thus, additional interactive cords can be cut from the same cord 400.

For example, a fourth longitudinal section 428 may be arranged after the third longitudinal section 412. Before the cord 400 is cut at the cutting location 424 to separate the individual interactive cord 426 from the cord 400, the fourth longitudinal section 428 can be arranged in a manner that corresponds with the first longitudinal section 408. A second touch-sensitive area can be formed within the fourth longitudinal portion 428 of the interactive cord. A fifth longitudinal portion of the braid can be arranged such that the plurality of conductive lines is not exposed along the outer surface of the outer layer to form a second non-touch-sensitive area within the fifth longitudinal portion of the braid. A sixth longitudinal portion can be arranged such that the sixth longitudinal portion is open along the longitudinal direction to form a second pair longitudinal edges of the outer layer that extend in the longitudinal direction of the braid (e.g., corresponding with the third longitudinal portion 412). The fifth longitudinal portion can be arranged between the fourth longitudinal portion and the sixth longitudinal portion with respect to the longitudinal direction of the braid such that a second individual interactive cord can be cut from the cord 426.

One or more intermediate longitudinal portions can be formed between the individual interactive cords (e.g., between the third longitudinal portion 412 and the fourth longitudinal portion 428). For example, a first intermediate longitudinal portion 430 and/or a second intermediate longitudinal portion 432 can be formed between the third longitudinal portion 412 and the fourth longitudinal portion 428. The intermediate longitudinal portions 430, 432 can be configured to rearrange and/or reorder the conductive lines 402 and/or non-conductive lines 404 as needed to start the next individual interactive cord. In the first intermediate longitudinal portion, the conductive lines 402 and/or non-conductive lines 404 can be arranged together such that at least of the conductive lines 402 are exposed along the outer surface 409 of the interactive cord. In the second intermediate longitudinal portion, the conductive lines 404 can be arranged within the outer layer 406 such that the conductive lines 402 are not exposed along the outer surface 409.

In some embodiments, a second cutting location 434 can be defined within the intermediate longitudinal portions (e.g., the second intermediate longitudinal portion 422). In some embodiments, the second intermediate longitudinal portion 422 can correspond with an aglet attachment portion 436 of the interactive cord. An aglet, for example as described below with reference to FIG. 14, can be coupled to the interactive cord at the aglet attachment portion 436. In some embodiments, some or all of the conductive lines 402 and/or internal conductive lines (if present) can be braided into the outer layer 406 in the aglet attachment portion 436 and/or second intermediate longitudinal portion 422, for example to facilitate connection with the aglet. The conductive lines 402 and/or internal conductive lines (if present) can be arranged in a predetermined order to facilitate such connection (for example as described above with respect to the third longitudinal portion 412.

Figure 8C:
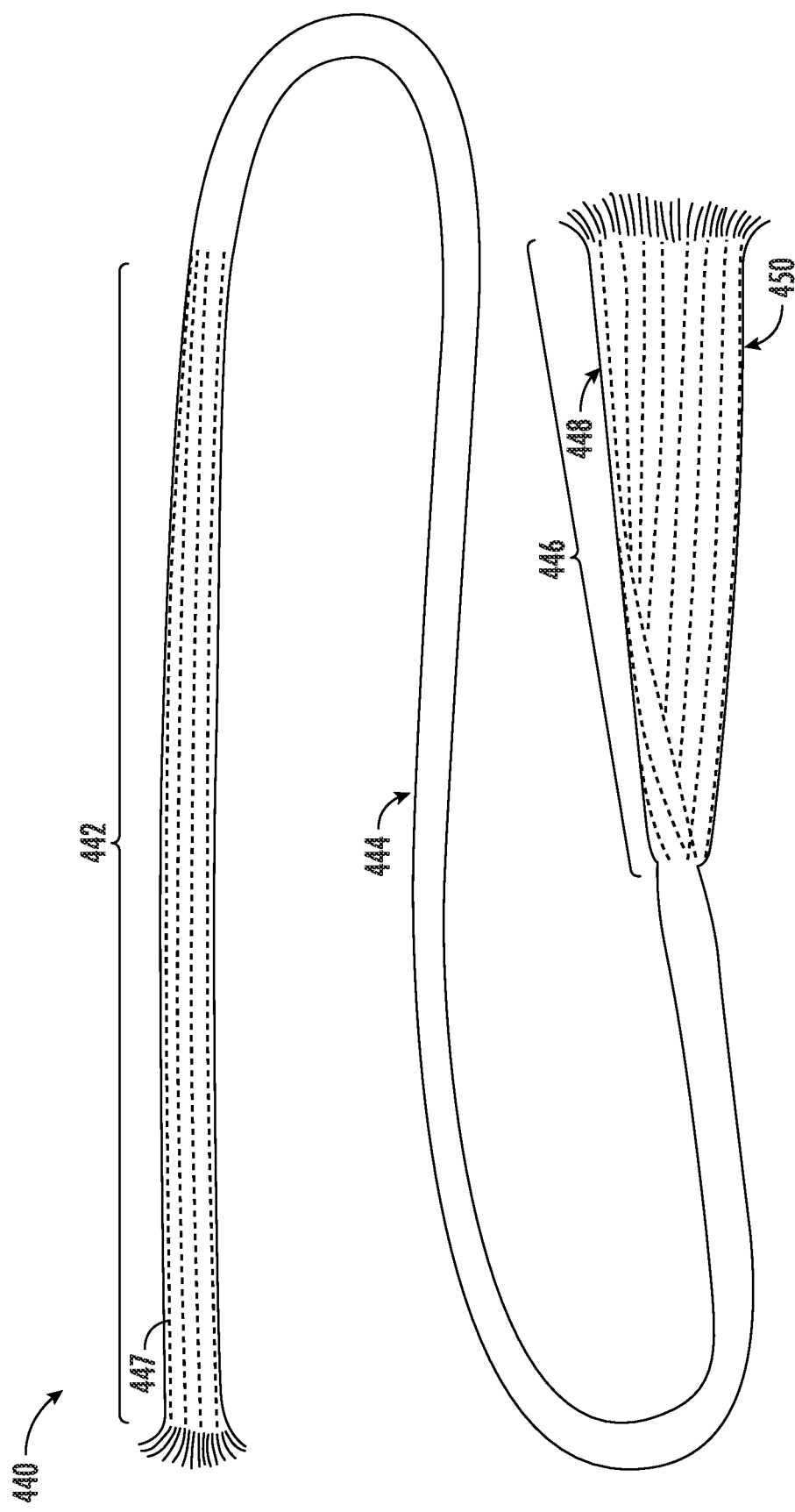
FIG. 8C illustrates another embodiment of an interactive cord according to aspects of the present disclosure.

FIG. 8C illustrates an example individual interactive cord 440 according to aspects of the present disclosure. The interactive cord 440 can include a first longitudinal portion 442, a second longitudinal portion 444, and a third longitudinal portion 446, for example as described above with respect to FIG. 8C. A plurality of conductive lines 447 can be arranged parallel with respect to each other along an outer surface 409 of the interactive cord 440, for example as described above with reference to FIG. 8A. In some embodiments, the conductive lines 402 do not intersect each other along the outer surface 409. The third longitudinal portion 446 can be open along the longitudinal direction to form a pair longitudinal edges 448, 450 of the outer layer that extend in the longitudinal direction of the interactive cord 440. The cord 440 can be configured for detecting changes in self-capacitance between the plurality of conductive lines 447.

In some embodiments, the configuration of the conductive lines 447 described above with respect to FIG. 8C can be included in the interactive cord 400 of FIG. 8A. Conversely, the configuration of conductive lines 402 in the first longitudinal portion 408 of FIG. 8A can be included in the interactive cord 440 of FIG. 8C. Furthermore, the first longitudinal portions 408, 442 described above with reference to FIGS. 8A and 8C can be replaced with and/or combined with the configurations described above with reference to FIGS. 5A through 7. For instance, the first longitudinal portion 408 of FIG. 8A can instead include two groups of conductive lines that are braided in opposite directions with respect to each other (e.g., as described above with reference to FIGS. 5C through 7). Similarly, one or more internal conductive lines as described with reference to FIGS. 6A-7 can be included in the embodiments of interactive cords 400, 440 described above with reference to FIGS. 8A through 8C. One or ordinary skill in the art would understand that further combinations and/or variations of embodiments described herein are within the scope of this disclosure.

Figure 9A:
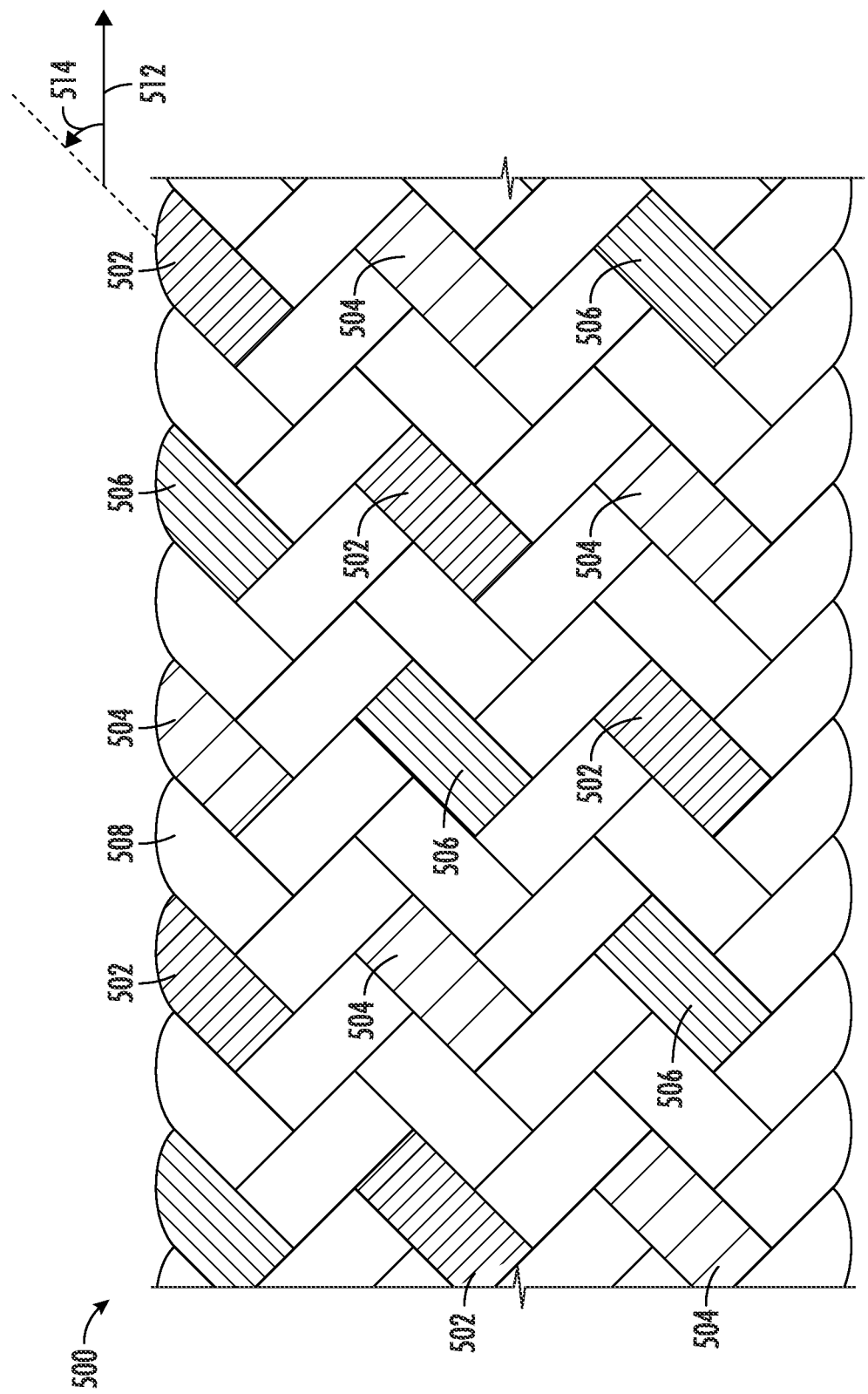
FIG. 9A illustrates an example braiding pattern for an interactive cord according to aspects of the present disclosure.

FIG. 9A illustrates an example braiding pattern 500 for the first longitudinal portion 408. For example, the braiding pattern 500 can include a first conductive line 502, a second conductive line 504, and a third conductive line 506 braided in a helical pattern with a plurality of non-conductive lines 508. An example braiding pattern 500 of the three conductive lines 502, 504, 506 is illustrated in FIG. 9A. However, it should be understood that any suitable number of conductive lines can be arranged together with the non-conductive lines. The helical pattern can have a pitch angle 514 with respect to a longitudinal direction 512 of the interactive cord. The pitch angle 514 can be less than about 30 degrees, in some embodiments less than about 20 degrees. The conductive lines 502, 504, 506 can be arranged parallel with respect to each other. In some embodiments, the conductive lines 502, 504, 506 do not intersect each other (e.g., within the first braided pattern or the second braided pattern).

Figure 9B:
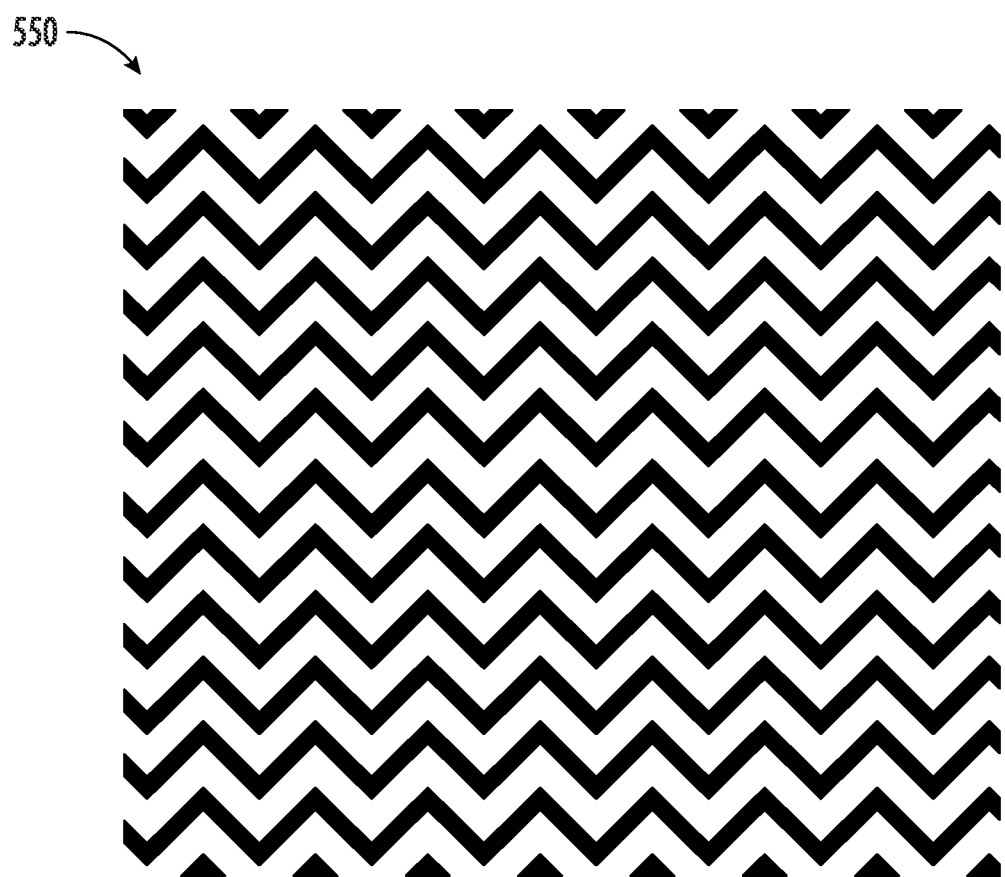
FIG. 9B illustrates another example braiding pattern for an interactive cord according to aspects of the present disclosure.

FIG. 9B illustrates another example braiding pattern 550 for an interactive cord according to aspects of the present disclosure. As shown in FIG. 9B, in some embodiments, the conductive lines can have a repeating zig-zag pattern. The conductive lines can generally be parallel with each other. This configuration can increase a contact surface area of the conductive threads in a given touch area. For instance, a portion of the outer surface that includes exposed conductive threads can be increased. This increase can increase a single-to-noise ratio when detecting user input gestures. Further, this configuration can provide improved identification, isolation, and/or interpolation between signals produced and/or induced in distinct conductive lines. As a result, more gestures can be identified and/or similar gestures can be distinguished from each other with greater accuracy. For instance, a pinching gesture can be distinguished from a pinch-and-roll gesture or the like. Thus, increased accuracy and/or sensitivity can be achieved.

Figure 10A:
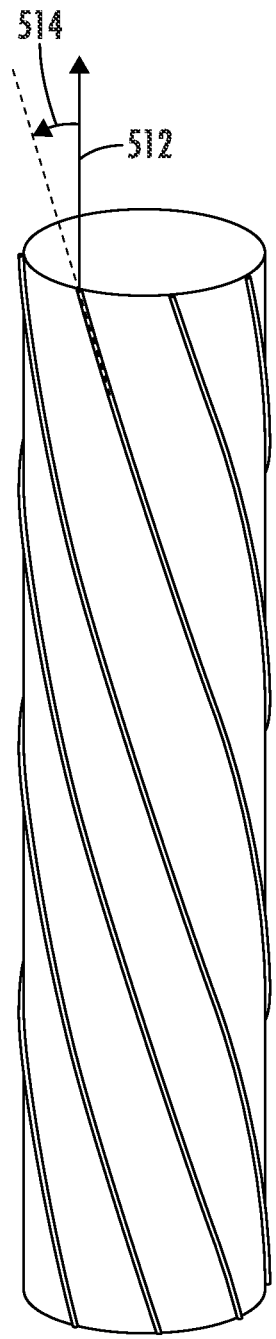
FIG. 10A illustrates a first example helical pattern having a first pitch angle according to aspects of the present disclosure.
Figure 10B:
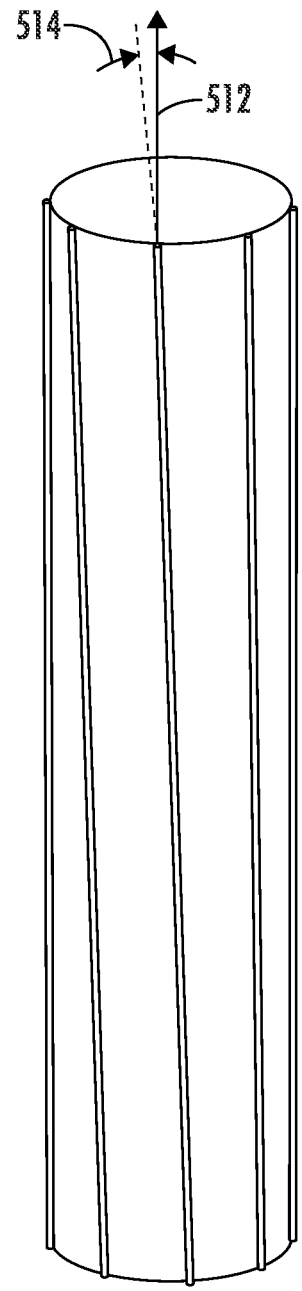
FIG. 10B illustrates a second example helical pattern having a second pitch angle according to aspects of the present disclosure.

FIG. 10A illustrates an example helical pattern 600 in which the pitch angle 514 is about 18 degrees, for example corresponding with the interactive cord 440 of FIG. 8A. FIG. 10B illustrates another example helical pattern 620 in which the pitch angle 514 is about 5 degrees, for example corresponding with the interactive cord of FIG. 8C. It should be understood that these are merely examples and any pitch angle can be implemented. Further, in some embodiments, the pitch angle can vary across the longitudinal direction. This can provide a variety (e.g., continuum) of differing detection characteristics along the length of the touch-sensitive area of the interactive cord. Such variations can facilitate detection of a longitudinal position of a user gesture within the touch-sensitive area.

Figure 11:
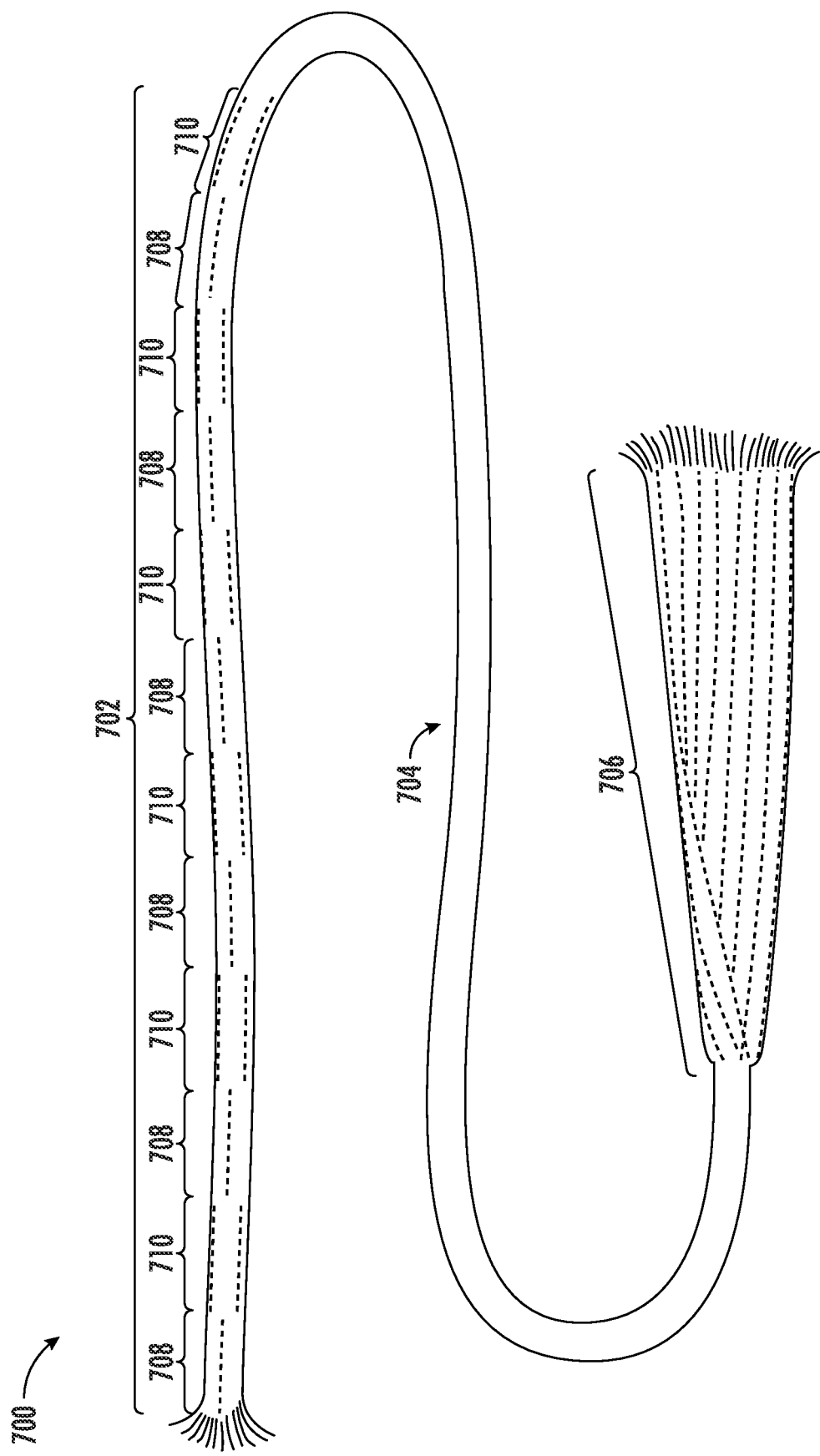
FIG. 11 illustrates another embodiment of an interactive cord according to aspects of the present disclosure.

FIG. 11 illustrates another example interactive cord 700 according to aspects of the present disclosure. The interactive cord 700 can generally be configured as the interactive cord 440 of FIG. 12C. The interactive cord 700 can be configured for detecting changes in self-capacitance between a plurality of conductive lines. The interactive cord 700 can include a first longitudinal section 702, a second longitudinal section 704, and a third longitudinal section 706. The first longitudinal section 702 of the interactive cord can include a touch-sensitive area along the first longitudinal portion 702. The touch-sensitive area can include at least one first section 708 having a first braided pattern and at least one second section 710 having a second braided pattern that is distinct from the first braided pattern. The first section(s) 708 can border the second section(s) 710.

A first set of conductive lines of the plurality of conductive lines can be exposed in the first braided pattern of the first section(s) 708. A second set of conductive lines of the plurality of conductive lines can be exposed in the second braided pattern in the second section(s) 710. The second set of conductive lines that are exposed in the first braided pattern can be different than the first set of conductive lines that are exposed in the second braided pattern. Such an arrangement can configure differing detection characteristics along the length of the touch-sensitive area of the interactive cord. Such variations can facilitate detection of which of the section(s) 708, 710 a given user gesture is being detected. Further, detection of additional user gestures can be facilitated. For instance, a user gesture can include sliding a hand or finger along the interactive cord in the longitudinal direction. The alternating section(s) 708, 710 can facilitate detection of such movement (e.g., including velocity, length, etc.). In some embodiments, the first and/or second section(s) 708, 710 could include a helical and/or parallel configuration (e.g., as described above with reference to FIGS. 8A, 9A, 10A, and/or 10B) and/or a zig-zag configuration (e.g., as described above with reference to FIG. 9B). Furthermore, in some embodiments the first and/or second section(s) 708, 710 could one or more of the configurations of conductive lines described above with respect to the touch-sensitive areas of FIGS. 5A through 7).

FIG. 12 is a simplified schematic illustration of a system 800 including an interactive cord according to aspects of the present disclosure. The system 800 can include a removable electronics module 802 electrically coupled with an interactive cord 804 via an internal electronics module 806. A grounding fabric 808 can be electrically connected with the interactive cord 804 via the internal electronics module 806 in some examples. For example, one or more of the conductive lines of the interactive cord 804 can be electrically connected with the grounding fabric 808 to ground selective ones of the conductive lines of the interactive cord 804. An aglet 809 can be electrically connected with one or more of the conductive lines of the interactive cord 804.

The removable electronics module 802 can include one or more modules, such as a communication module 810, communication radio 812, a haptic module 814, and/or a power supply 816 (such as a battery). The communication module 810 can be or include a Bluetooth module, such as Bluetooth Low Energy (BLE). The communication radio 812 can be or include a radio antenna sized and configured to receive and/or transmit Bluetooth signals. The haptic module 814 can be configured to provide haptic feedback to the user via vibration, clicking, or other movement. The power supply 816 can be or include a battery configured to provide the removable electronics module 802 with power.

The conductive lines are coupled to an internal electronics module 806 (e.g., using a connecting ribbon with can be utilized to position the conductive lines for connection to a plurality of electrical contact pads (not shown) of internal electronics module 124). The plurality of conductive lines can be collected and organized using a ribbon with a pitch that matches a corresponding pitch of connection points of an electronic component such as a component of internal electronics module 806.

Internal electronics module 806 may include sensing circuitry (not shown) in electrical communication with the plurality of conductive lines. The internal electronics module 806 may include one or more communication ports. The internal electronics module 806 can include includes a first communication port and a second communication port. The first communication port can be coupled to a first end portion of a communications cable. The Communications cable is one example of a portion of a communication interface 162 (FIG. 3). The Communication cable can includes a second end portion that is coupled to a receptacle that can be configured to removably connect a second electronics module 802 to the pre-fabricated sensor assembly via the communication cable. The receptacle may be manufactured from a plastic, metal, polymer, or other suitable material. The receptacle can include one or more electrical contacts not shown for electrically coupling the removable electronics module to the pre-fabricated sensor assembly.

Figure 13A:
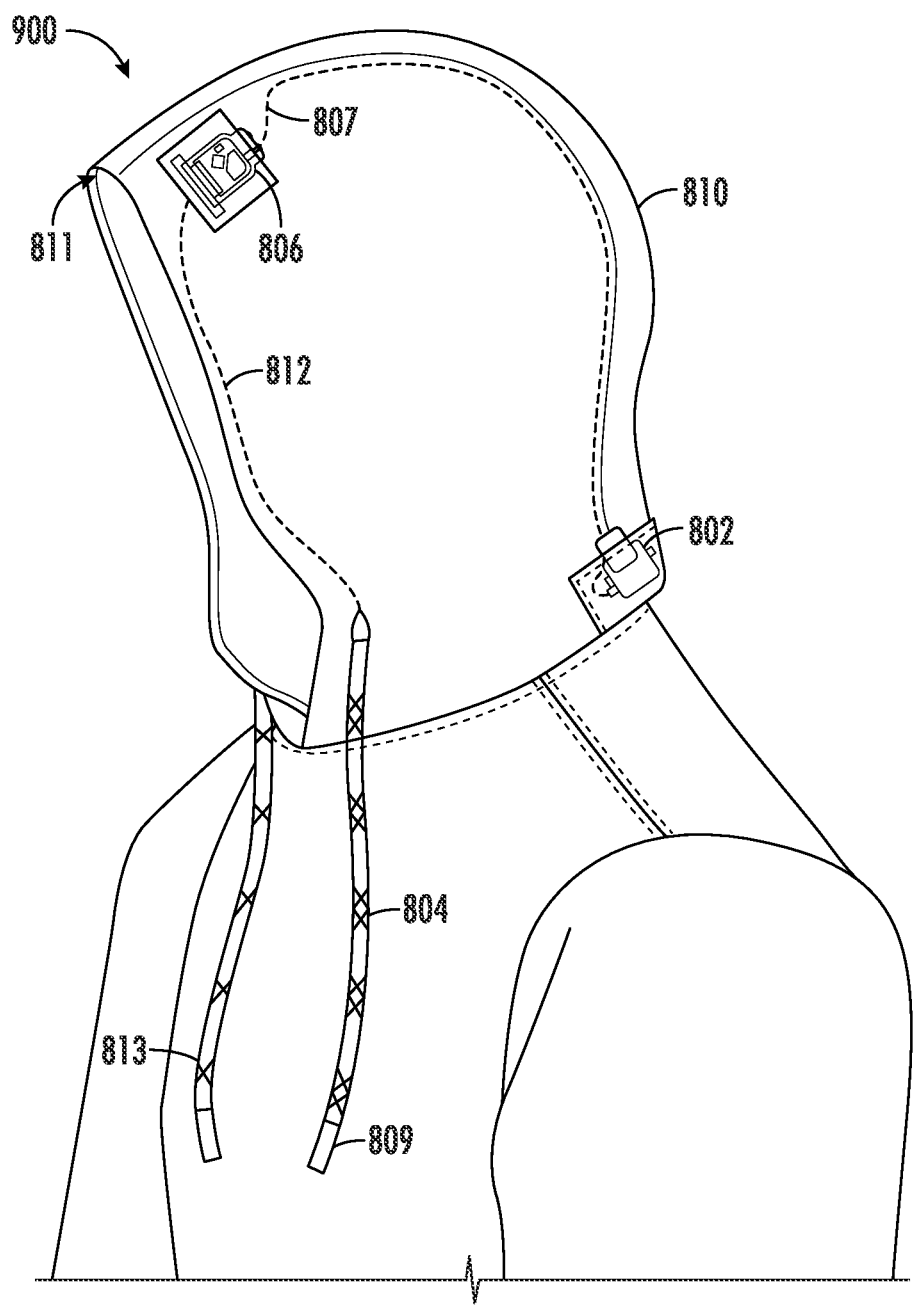
FIG. 13A illustrates a garment, such as a hooded sweatshirt, which can include one or more components of the system of FIG. 8 according to aspects of the present disclosure.

FIG. 13A illustrates a garment 900, such as a hooded sweatshirt or "hoodie," can include one or more components of the system 800 of FIG. 12 according to aspects of the present disclosure. The garment 900 can include the interactive cord 804, internal electronics module 806, and the removable electronics module 802 of FIG. 12. The removable electronics module 802 can be electrically connected with the interactive cord 804 via the internal electronics module 806. The internal electronics module 806 can be electrically connected with the removable electronics module 802 by a cable 807. The internal electronics module 806 can be electrically connected with one or more of the conductive lines of the interactive cord 804. The interactive cord 804 can extend inside a hood 810 of the garment 900, for example, as illustrated by dotted line 812. An aglet 809 can be connected with the interactive cord 804, for example at an end of the interactive cord 804.

In some embodiments, the interactive cord 809 can terminate within the hood 810, for example at a crest at a top 811 of the hood 810. An additional cord 813 can be included opposite the interactive cord 809. In some embodiments, the additional cord 813 can be non-interactive. However, in some embodiments the additional cord 813 can be interactive and generally configured similarly to the interactive cord 809 as described herein. In yet further embodiments, A single interactive cord can extend through the hood 810 and protrude from both sides of the hood 810, for example as described with respect to and illustrated in FIG. 2.

Figure 13B:
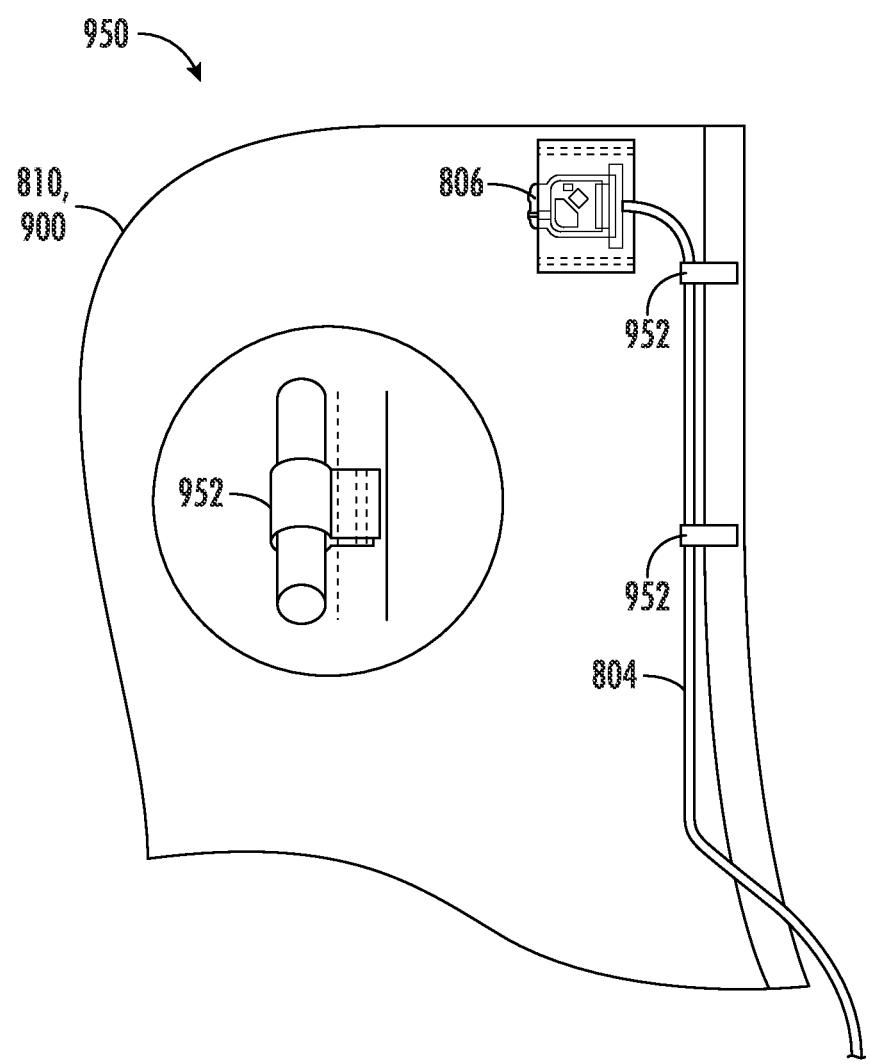
FIG. 13B illustrates a strain relief configuration according to aspects of the present disclosure.

FIG. 13B illustrates a strain relief configuration 950 according to aspects of the present disclosure. The strain relief configuration 950 can include one or more clamps 952 or other attachments coupled with the garment 900 (e.g., the hood 810 of the garment 900). The clamps 952 can be coupled to the interactive cord 804 to provide strain relief by preventing tension applied to the interactive cord from pulling on the internal electronics module 806.

Figure 14:
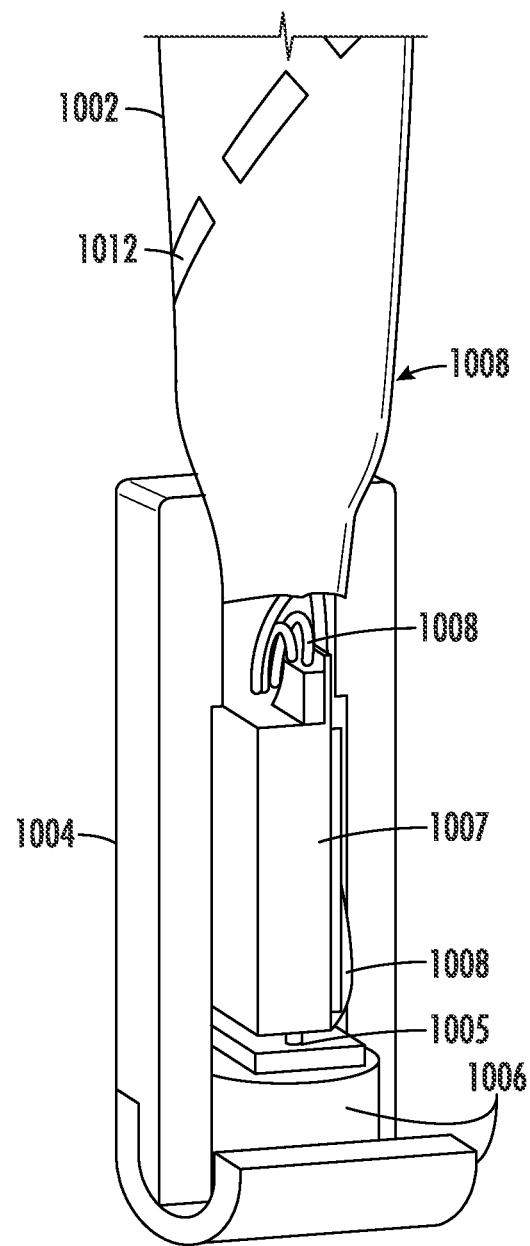
FIG. 14 illustrates an example interactive cord coupled with an aglet according to aspects of the present disclosure.

FIG. 14 illustrates an example interactive cord 1002 coupled with an aglet 1004 according to aspects of the present disclosure. The aglet 1004 can include a light-emitting element 1005, such as a light-emitting diode. The light-emitting element 1006 can be electrically connected with the interactive cord 1002. For example, in some embodiments, one or more internal conductive lines 1008 can extend through the interactive cord 1002 without being exposed along an outer surface 1010 of the interactive cord 1002 (e.g., along the first longitudinal portion 408 or the second longitudinal portion 410 of the interactive cord 400 of FIG. 8A and/or the first longitudinal portion 442 or the second longitudinal portion 444 of the interactive cord 440 of FIG. 8C). In some embodiments, the interactive cord 1002 can include one or more light-emitting lines 1012. The light-emitting lines 1012 can be braided into the interactive cord 1002 like another conductive line. For instance, the light-emitting line(s) 1012 can be braided according to the first braided pattern and/or second braided pattern described above. The light-emitting element 1006 and/or light-emitting lines 1012 can be illuminated in a variety of circumstances and/or in response to one or more user inputs with respect to the interactive cord 1002. For instance, the light-emitting element 1006 and/or light-emitting lines 1012 can be illuminated to indicate and/or confirm that a user input was received with respect to the conductive lines.

In some embodiments, the aglet 1004 can include one or more sensors 1006. Example sensors include microphones, temperature sensors, humidity sensors, air pressure sensors, light sensors, electrocardiogram (EKG) sensors, inertial measurement units (IMU), touch sensors (e.g., capacitive, pressure, etc.) and pollution/air quality sensors.

In some embodiments, the aglet 1004 can include one or more haptic feedback devices 1007. The haptic feedback devices 1007 can vibrate, click, or otherwise move in a manner to provide the user with feedback (e.g., that a user gesture has been received, of a status of the interactive cord or other device, or the like).

Figure 15:
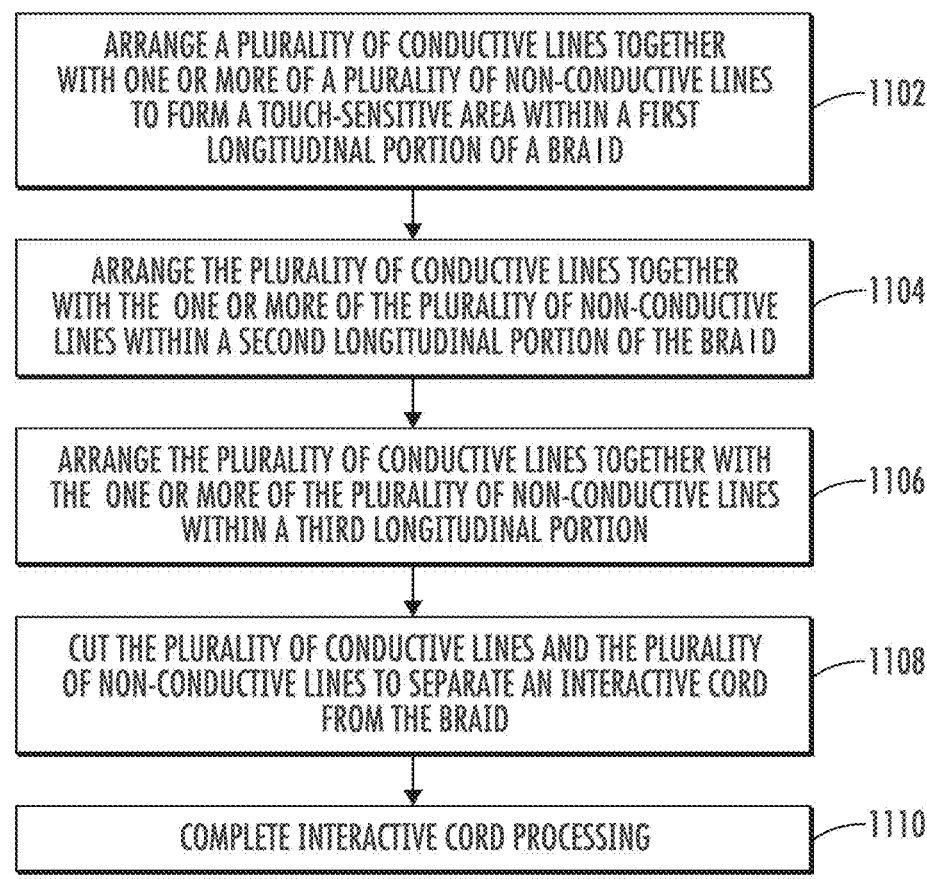
FIG. 15 illustrates a flowchart of a method of forming an interactive cord according to aspects of the present disclosure.

FIG. 15 is a flowchart depicting an example method 1100 of forming an interactive cord according to aspects of the present disclosure. Although FIG. 15 depicts steps performed in a particular order for purposes of illustration and discussion, method 1100 of FIG. 15 and the other methods described herein are not limited to the particularly illustrated order or arrangement. The various steps of the methods disclosed herein can be omitted, rearranged, combined, and/or adapted in various ways without deviating from the scope of the present disclosure.

At (1102), the method 1100 can include forming a plurality of conductive lines together with one or more of a plurality of non-conductive lines to form a touch-sensitive area within a first longitudinal portion of a braid. Forming the plurality of conductive lines together with one or more of a plurality of non-conductive lines can include braiding, weaving, lace-braiding, or a combination thereof.

At (1104), the method 1100 can include braiding the plurality of conductive lines together with the one or more of the plurality of non-conductive lines within a second longitudinal portion of the braid such that the plurality of conductive lines are not exposed along an outer surface of the outer layer to form a non-touch-sensitive area within the second longitudinal portion of the braid.

At (1106), the method 1100 can include braiding the plurality of conductive lines together with the one or more of the plurality of non-conductive lines within a third longitudinal portion such that the third longitudinal portion is open along a longitudinal direction to form a pair longitudinal edges of the outer layer that extend in the longitudinal direction of the braid. The second longitudinal portion can be arranged between the first longitudinal portion and the third longitudinal portion with respect to the longitudinal direction of the braid.

At (1108), the method 1100 cutting the plurality of conductive lines and the plurality of non-conductive lines to separate an interactive cord from the braid. For example, the conductive lines and/or the plurality of non-conductive lines can be cut at a first location that intersects the third longitudinal portion of the braid, for example as described above with respect to FIG. 8A. However, it should be understood that the conductive lines can be cut at a different location that the non-conductive lines.

If an additional longitudinal portion is not to be braided for the interactive cord, method (1100) continues at 1110. In some examples, method (1100) can continue by performing further operations to complete the interactive cord, such as by attaching an internal electronics module to the individual conductive filaments, etc.

Figure 16:
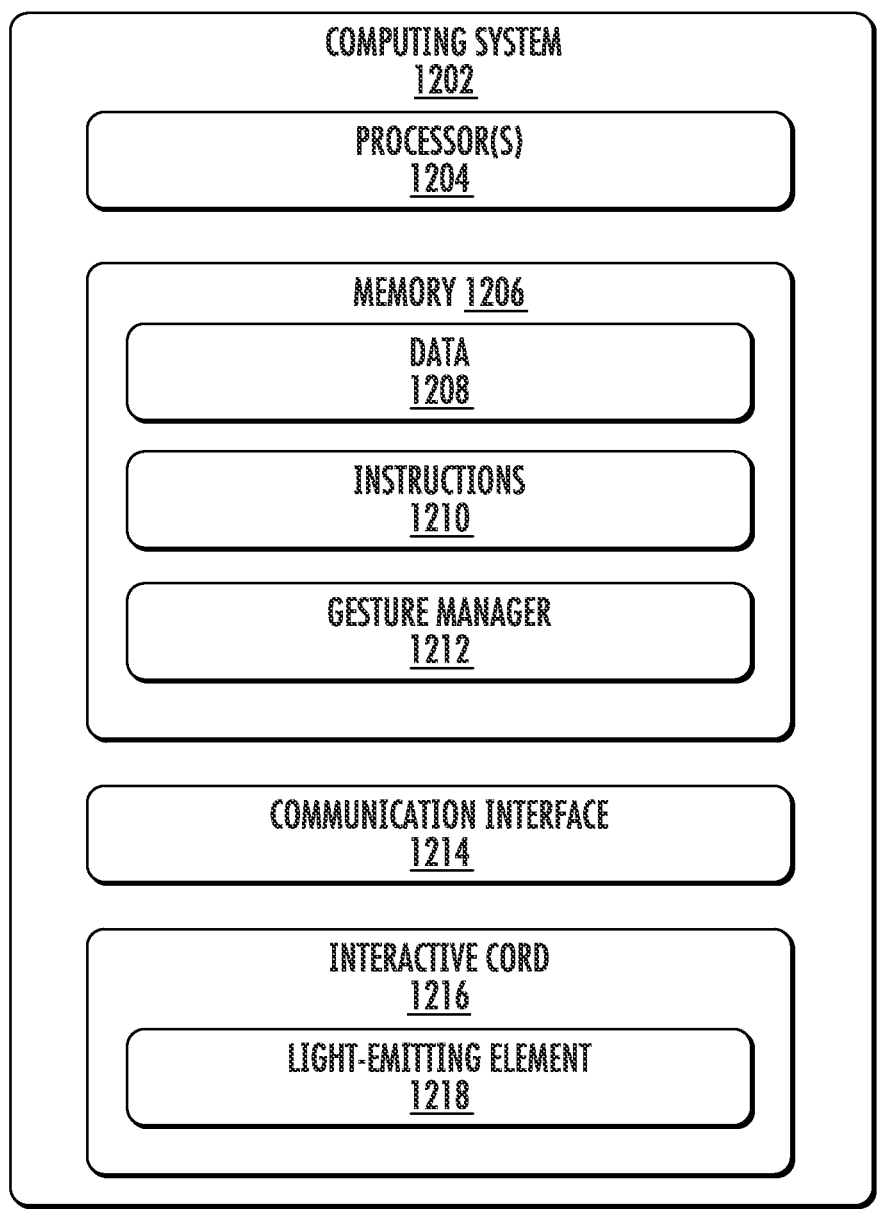
FIG. 16 illustrates a block diagram of an example computing system that can be used to implement any type of computing device as described herein.

FIG. 16 illustrates various components of an example computing system 1202 that can implement any type of client, server, and/or computing device described herein. In embodiments, computing system 1202 can be implemented as one or a combination of a wired and/or wireless wearable device, System-on-Chip (SoC), and/or as another type of device or portion thereof. Computing system 1202 may also be associated with a user (e.g., a person) and/or an entity that operates the device such that a device describes logical devices that include users, software, firmware, and/or a combination of devices.

Computing system 1202 includes a communication interface 1214 that enables wired and/or wireless communication of data 1208 (e.g., received data, data that is being received, data scheduled for broadcast, data packets of the data, etc.). Data 1208 can include configuration settings of the device, media content stored on the device, and/or information associated with a user of the device. Media content stored on computing system 1202 can include any type of audio, video, and/or image data. Computing system 1202 includes one or more data inputs via which any type of data, media content, and/or inputs can be received, such as human utterances, touch data generated by the interactive cord 1216, user-selectable inputs (explicit or implicit), messages, music, television media content, recorded video content, and any other type of audio, video, and/or image data received from any content and/or data source.

Communication interfaces can be implemented as any one or more of a serial and/or parallel interface, a wireless interface, any type of network interface, a modem, and as any other type of communication interface. Communication interfaces provide a connection and/or communication links between computing system 1202 and a communication network by which other electronic, computing, and communication devices communicate data with computing system 1202.

Computing system 1202 includes one or more processors 1204 (e.g., any of microprocessors, controllers, and the like), which process various computer-executable instructions to control the operation of computing system 1202 and to enable techniques for, or in which can be embodied, interactive cord. Alternatively or in addition, computing system 1202 can be implemented with any one or combination of hardware, firmware, or fixed logic circuitry that is implemented in connection with processing and control circuits. Although not shown, computing system 1202 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1202 also includes memory 1206 which may include computer-readable media, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory 1206 may also include a mass storage media device of computing system 1202.

Computer-readable media provides data storage mechanisms to store device data, as well as computer-readable instructions 1210 which can implement various device applications and any other types of information and/or data related to operational aspects of computing system 1202. For example, an operating system can be maintained as a computer application with computer-readable media and executed on processors 1204. Device applications may include a device manager, such as any form of a control application, software application, signal-processing and control module, code that is native to a particular device, a hardware abstraction layer for a particular device, and so on.

Memory 1206 may also include a gesture manager 1212. Gesture manager 1212 is capable of interacting with applications and the interactive cord 1216 effective to activate various functionalities associated with computing device 106 and/or applications through touch-input (e.g., gestures) received by the interactive cord 1216. Gesture manager 1212 may be implemented at a computing device (e.g., corresponding with the computing device 106 of FIG. 1).

The interactive cord 1216 can include a light-emitting element 1218, such as a light-emitting diode 1006 of the aglet 1004 of FIG. 14 and/or the light-emitting line(s) 1012 of the interactive cord 1002 of FIG. 10. The memory 1206 can store instructions for illuminating the light-emitting element 1218 in a variety of circumstances and/or in response to various user inputs. For example, the computing system 1202 can illuminate the light-emitting element 1218 to confirm that a user input was detected with respect to the interactive cord 1216, to prompt the user to provide a certain input with respect to the interactive cord 1216, or the like.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An interactive cord, comprising:
a plurality of non-conductive lines;
a plurality of conductive lines at least partially arranged with one or more of the plurality of non-conductive lines to form at least a portion of the interactive cord, the interactive cord comprising an outer layer, wherein the plurality of conductive lines is arranged together with the one or more of the plurality of non-conductive lines along a first longitudinal portion of the interactive cord to form a touch-sensitive area along the first longitudinal portion of the interactive cord, the plurality of conductive lines is arranged along a second longitudinal portion of the interactive cord such that the plurality of conductive lines are not exposed along an outer surface of the outer layer to form a non-touch-sensitive area along the second longitudinal portion of the interactive cord, and
the plurality of conductive lines is arranged together with the one or more of the plurality of non-conductive lines along a third longitudinal portion, and wherein the second longitudinal portion is arranged between the first longitudinal portion and the third longitudinal portion with respect to a longitudinal direction of the interactive cord, and the third longitudinal portion is open along the longitudinal direction to form a pair longitudinal edges of the outer layer that extend in the longitudinal direction of the interactive cord;
an internal conductive line extending through the outer layer without being exposed along the outer surface of the outer layer within the first longitudinal portion or the second longitudinal portion of the interactive cord; and
an aglet electrically connected with the internal conductive line.

2. The interactive cord of claim 1, wherein the plurality of conductive lines is arranged together with the one or more of the plurality of non-conductive lines such that the plurality of conductive lines do not intersect each other along the first longitudinal portion of the interactive cord.

3. The interactive cord of claim 1, wherein the plurality of conductive lines is arranged together with the one or more of the plurality of non-conductive lines such that the plurality of conductive lines are arranged parallel with respect to each along the outer surface of the outer layer.

4. The interactive cord of claim 3, wherein the plurality of conductive lines form a helical pattern with respect to the longitudinal direction of the interactive cord.

5. The interactive cord of claim 4, wherein, the helical pattern has a pitch angle with respect to the longitudinal direction of the interactive cord, the pitch angle being less than about 30 degrees.

6. The interactive cord of claim 1, wherein the aglet includes at least one electrically powered component.

7. The interactive cord of claim 6, wherein the interactive cord includes at least one additional conductive line that is coupled to the at least one electrically powered component.

8. The interactive cord of claim 7, wherein at least one additional conductive line is formed within an interior portion of the interactive cord at the first longitudinal portion and the second longitudinal portion.

9. The interactive cord of claim 7, wherein the at least one additional conductive line is configured to provide power to the at least one electrically powered component.

10. The interactive cord of claim 7, wherein the at least one additional conductive line is configured to transfer data with the at least one electrically powered component.

11. The interactive cord of claim 6, wherein the at least one electrically powered component includes a light source.

12. The interactive cord of claim 1, wherein at least some of the plurality of conductive lines are exposed along an outer surface of the outer layer within the first longitudinal portion of the interactive cord.

13. The interactive cord of claim 12, wherein the conductive lines that are exposed along the outer surface of the outer layer along the first longitudinal portion of the interactive cord comprise respective insulation layers that are exposed along the outer surface.

14. The interactive cord of claim 1, wherein the touch-sensitive area comprises at least one first section having a first braided pattern and at least one second section having a second braided pattern that is distinct from the first braided pattern, the at least one second section bordering the at least one first section.

15. The interactive cord of claim 14, wherein the plurality of conductive lines do not intersect each other along at least one of the first braided pattern or the second braided pattern.

16. The interactive cord of claim 14, wherein a first set of conductive lines of the plurality of conductive lines are exposed in the first braided pattern, and a second set of conductive lines of the plurality of conductive lines are exposed in the second braided pattern, the second set of conductive lines differing from the first set of conductive lines.

17. The interactive cord of claim 14, wherein:
the at least one first section comprises a plurality of first sections having the first braided pattern; and
the at least one second section comprises a plurality of second sections having the second braided pattern, the plurality of second sections alternating with the plurality of first sections.

18. The interactive cord of claim 1, further comprising at least one light-emitting line.

19. A method for forming an interactive cord, the method comprising:
forming a plurality of conductive lines together with one or more of a plurality of non-conductive lines to form a touch-sensitive area within a first longitudinal portion of a braid;
forming the plurality of conductive lines together with the one or more of the plurality of non-conductive lines within a second longitudinal portion of the braid such that the plurality of conductive lines are not exposed along an outer surface of the outer layer to form a non-touch-sensitive area within the second longitudinal portion of the braid;
forming the plurality of conductive lines together with the one or more of the plurality of non-conductive lines within a third longitudinal portion such that the third longitudinal portion is open along a longitudinal direction to form a pair longitudinal edges of the outer layer that extend in the longitudinal direction of the braid, and wherein the second longitudinal portion is arranged between the first longitudinal portion and the third longitudinal portion with respect to the longitudinal direction of the braid; and
forming an internal conductive line extending through the outer layer without being exposed along the outer surface of the outer layer within the first longitudinal portion or the second longitudinal portion of the interactive cord;
cutting the plurality of conductive lines, the plurality of non-conductive lines, and the internal conductive line to separate an interactive cord from the braid; and
electrically connecting an aglet with the internal conductive line.

20. The method of claim 19, further comprising, before cutting the plurality of conductive lines and the plurality of non-conductive lines at the first location:
braiding the plurality of conductive lines together with the one or more of the plurality of non-conductive lines to form a second touch-sensitive area within a fourth longitudinal portion of the interactive cord.

21. The method of claim 20, further comprising, before cutting the plurality of conductive lines and the plurality of non-conductive lines at the first location:
arranging the plurality of conductive lines together with the one or more of the plurality of non-conductive lines within a fifth longitudinal portion of the braid such that the plurality of conductive lines are not exposed along the outer surface of the outer layer to form a second non-touch-sensitive area within the fifth longitudinal portion of the braid; and
arranging the plurality of conductive lines together with the one or more of the plurality of non-conductive lines within a sixth longitudinal portion such that the sixth longitudinal portion is open along the longitudinal direction to form a second pair longitudinal edges of the outer layer that extend in the longitudinal direction of the braid, and wherein the fifth longitudinal portion is arranged between the fourth longitudinal portion and the sixth longitudinal portion with respect to the longitudinal direction of the braid.

22. The method of claim 21, further comprising after braiding the plurality of conductive lines together with the one or more of the plurality of non-conductive lines within the sixth longitudinal portion:
cutting the plurality of conductive lines and the plurality of non-conductive lines at a second location that intersects the third longitudinal portion of the braid to separate an additional interactive cord from the braid.

* * * * *